June 12, 1956  H. M. GERSMAN  2,750,034
METHOD AND APPARATUS FOR EXTRUSION OF PLASTIC MATERIALS
Filed June 15, 1951  16 Sheets-Sheet 1
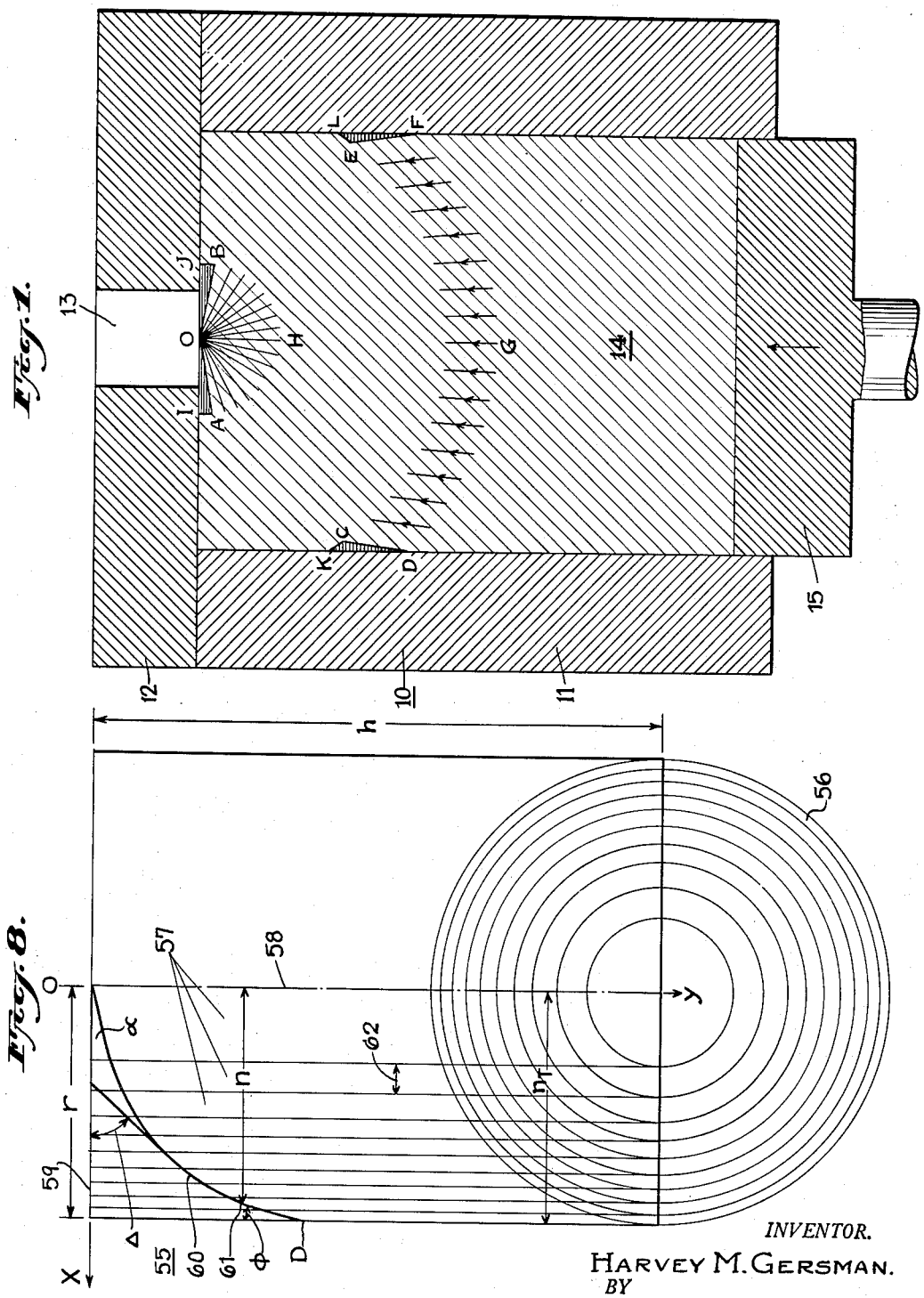
INVENTOR.
HARVEY M. GERSMAN.
BY
Ward Crosby S. Neal.
ATTORNEY.

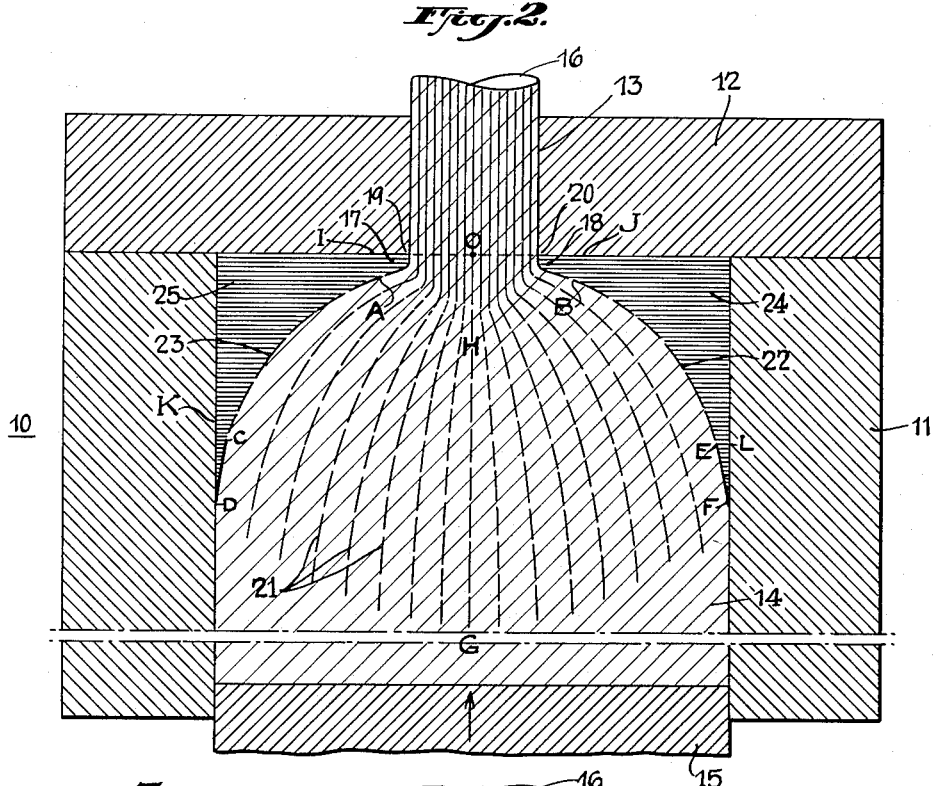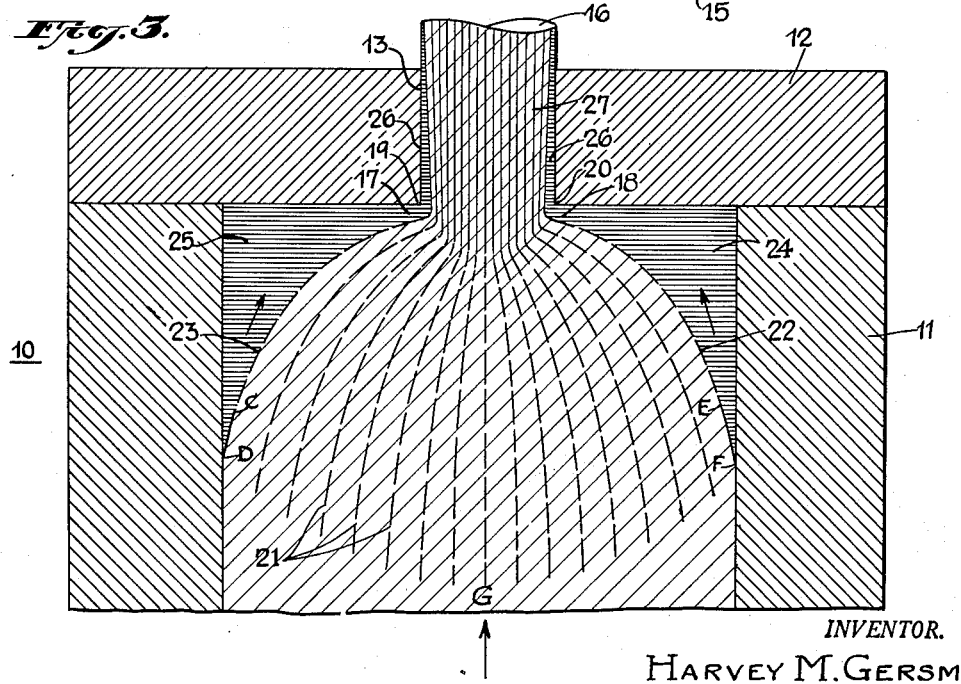

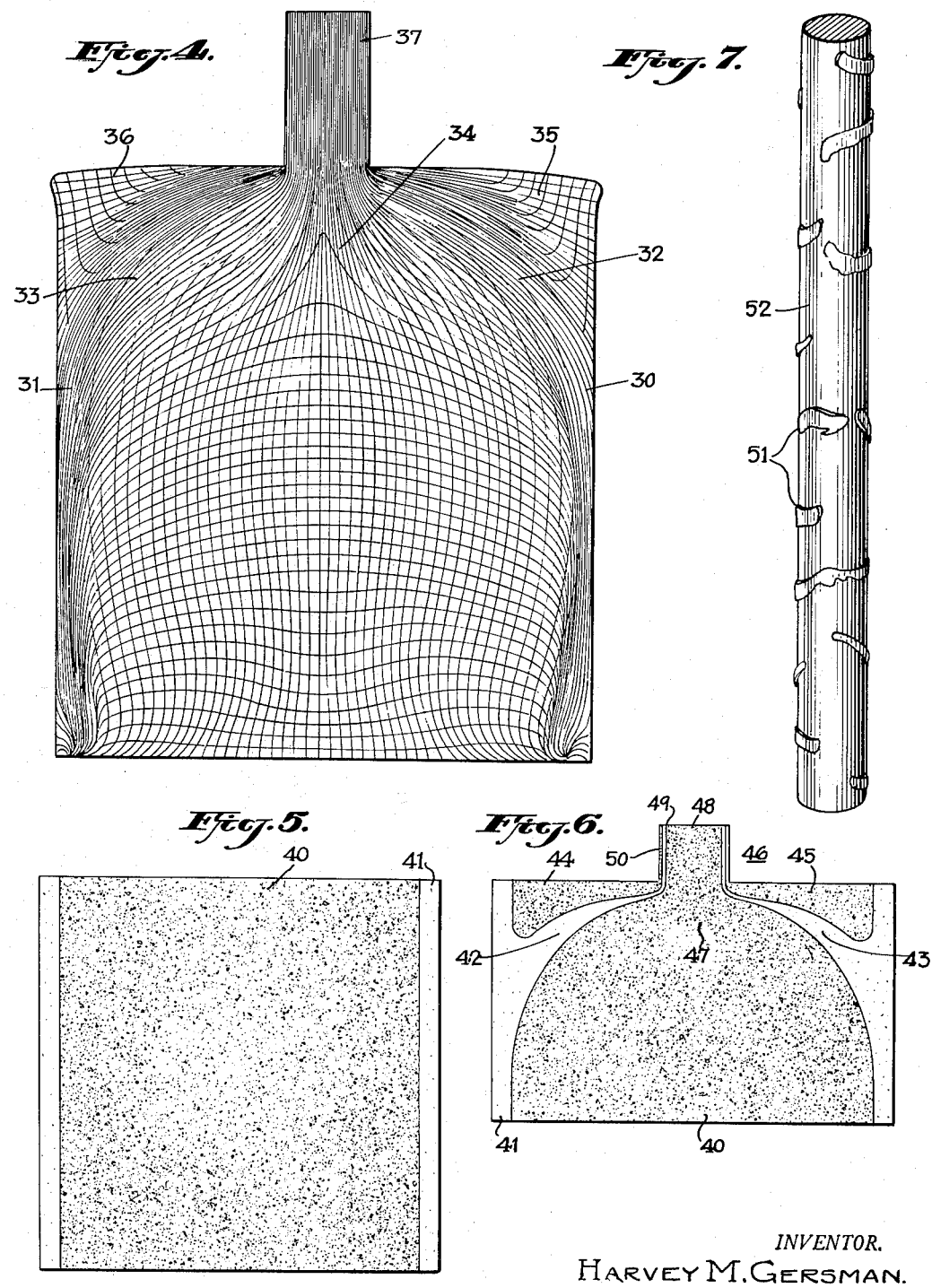

June 12, 1956      H. M. GERSMAN      2,750,034
METHOD AND APPARATUS FOR EXTRUSION OF PLASTIC MATERIALS
Filed June 15, 1951      16 Sheets-Sheet 5
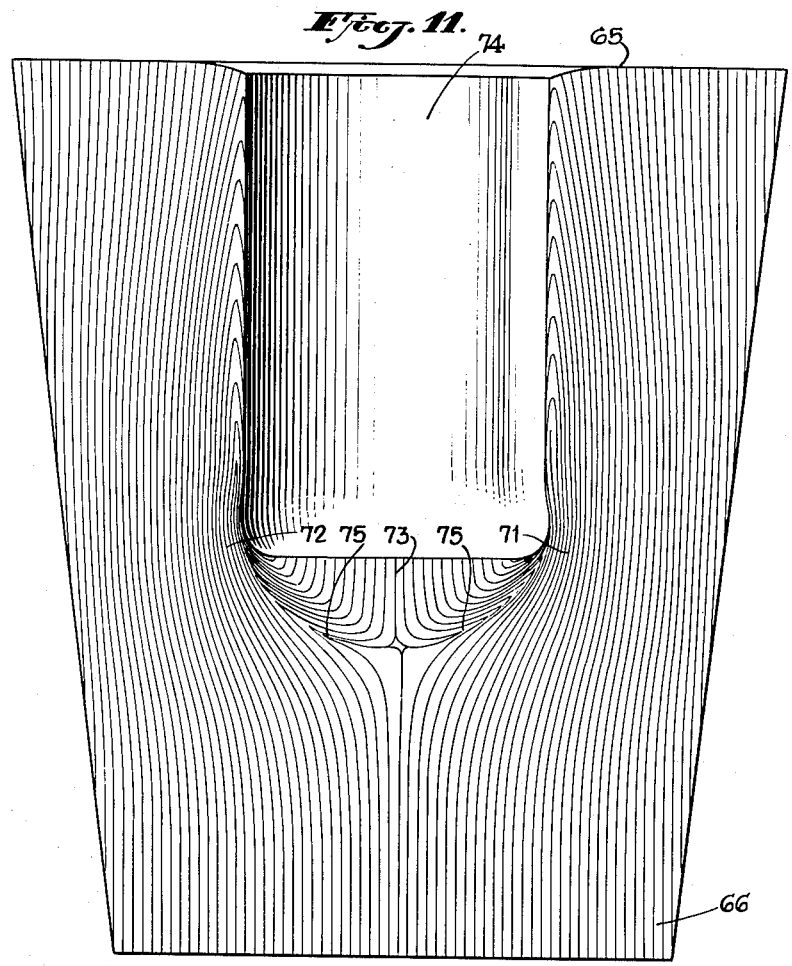
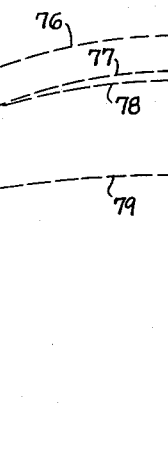
HIGH CARBON TOOL STEEL
FLOW ANGLE 14° 2.21'
HOBALLOY
(LOW CARBON ALLOY)
FLOW ANGLE 11° 53.37'
HIGH SPEED STEEL
FLOW ANGLE 14° 36'
PLASTICENE
(SIMILAR TO SOFT METALS)
FLOW ANGLE 10° 6'
INVENTOR.
HARVEY M. GERSMAN
BY *Ward Crosby & Neal*
ATTORNEYS.

June 12, 1956  H. M. GERSMAN  2,750,034
METHOD AND APPARATUS FOR EXTRUSION OF PLASTIC MATERIALS
Filed June 15, 1951  16 Sheets-Sheet 6
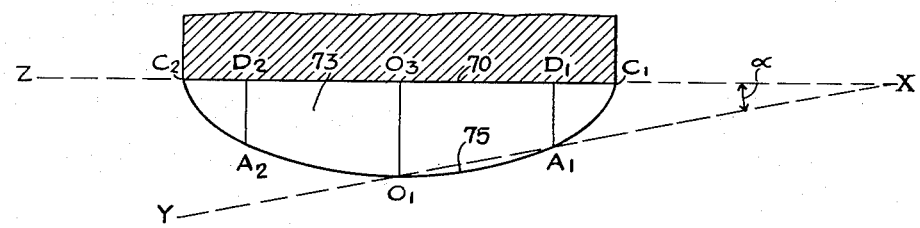
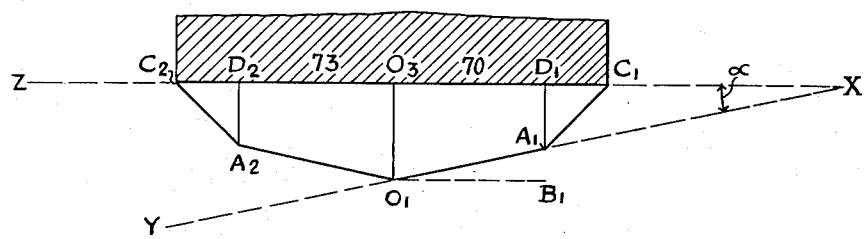
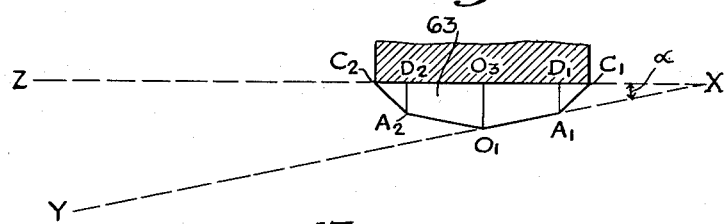
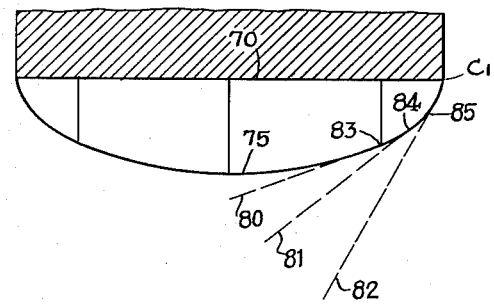
INVENTOR.
HARVEY M. GERSMAN.
BY
ATTORNEYS.

June 12, 1956  H. M. GERSMAN  2,750,034
METHOD AND APPARATUS FOR EXTRUSION OF PLASTIC MATERIALS
Filed June 15, 1951  16 Sheets-Sheet 8

INVENTOR.
HARVEY M. GERSMAN.
BY Ward Crosby & Neal
ATTORNEYS.

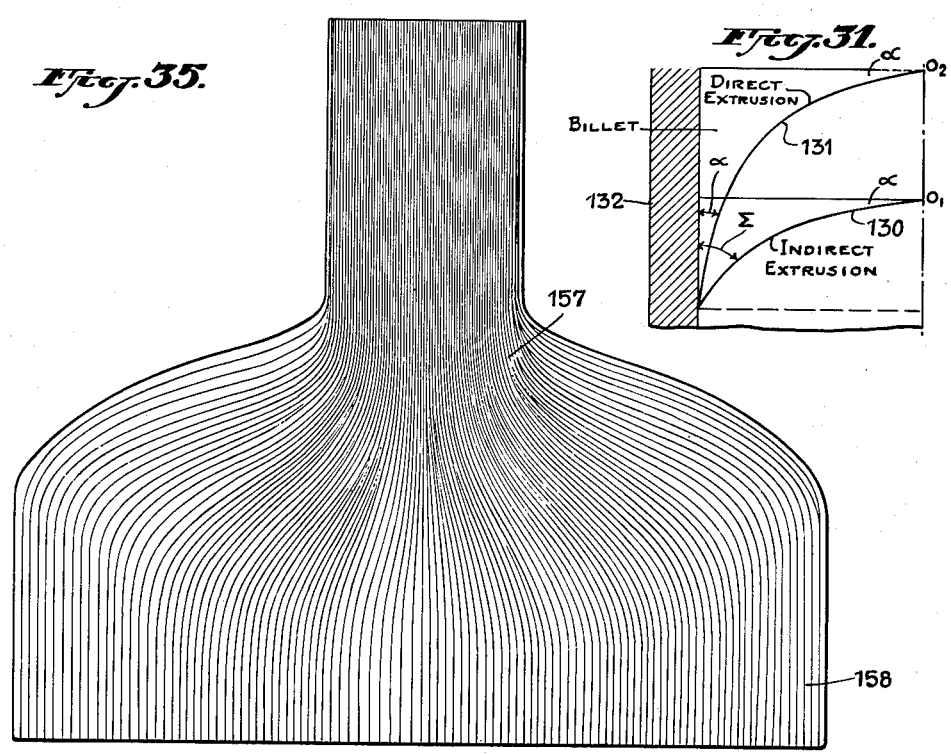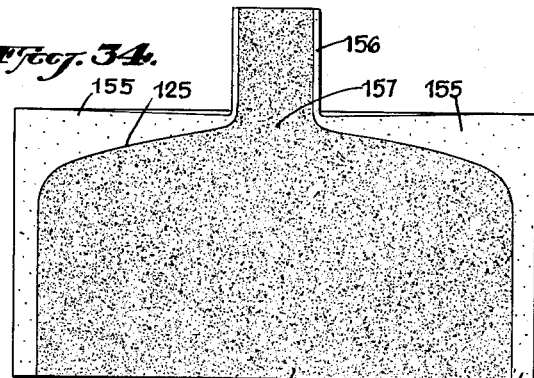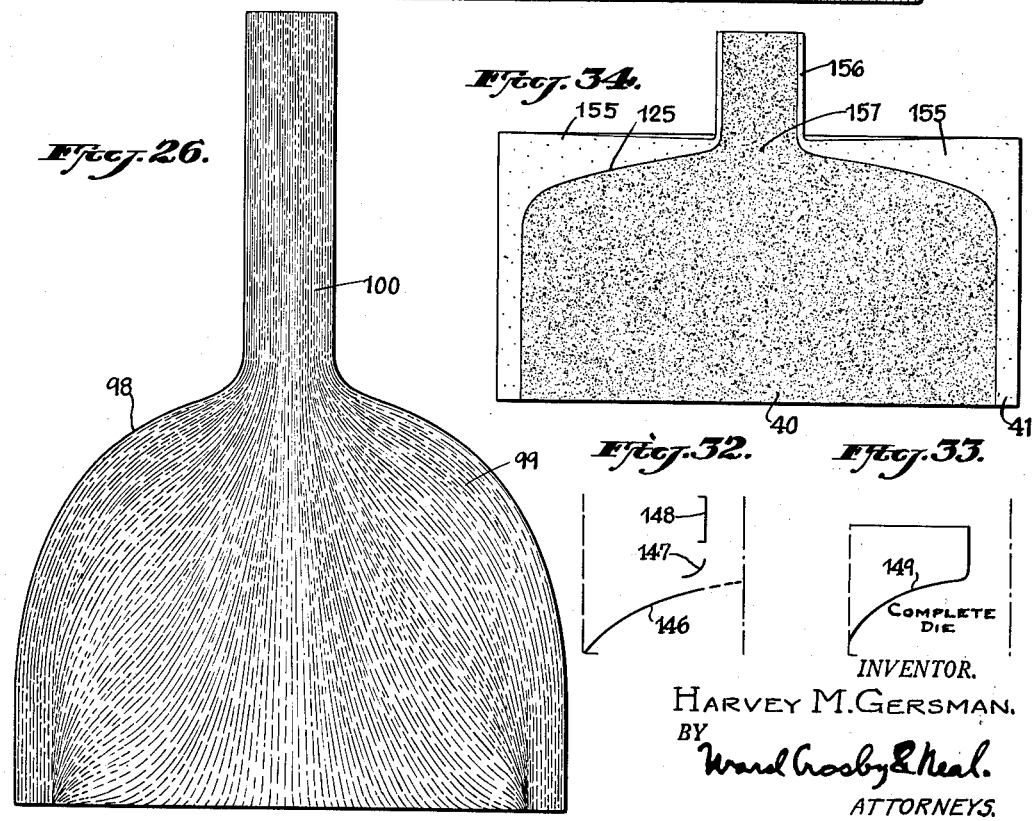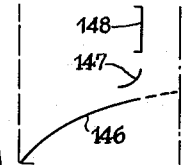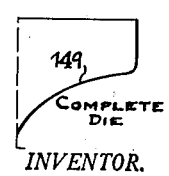

June 12, 1956  H. M. GERSMAN  2,750,034
METHOD AND APPARATUS FOR EXTRUSION OF PLASTIC MATERIALS
Filed June 15, 1951  16 Sheets-Sheet 10

INVENTOR.
HARVEY M. GERSMAN.
BY Ward Crosby & Neal.
ATTORNEYS.

June 12, 1956  H. M. GERSMAN  2,750,034
METHOD AND APPARATUS FOR EXTRUSION OF PLASTIC MATERIALS
Filed June 15, 1951  16 Sheets-Sheet 11

INVENTOR.
HARVEY M. GERSMAN.
BY Ward Crosby & Neal.
ATTORNEYS.

June 12, 1956  H. M. GERSMAN  2,750,034
METHOD AND APPARATUS FOR EXTRUSION OF PLASTIC MATERIALS
Filed June 15, 1951  16 Sheets-Sheet 12

INVENTOR.
HARVEY M. GERSMAN.
BY
Ward Crosby & Neal.
ATTORNEYS.

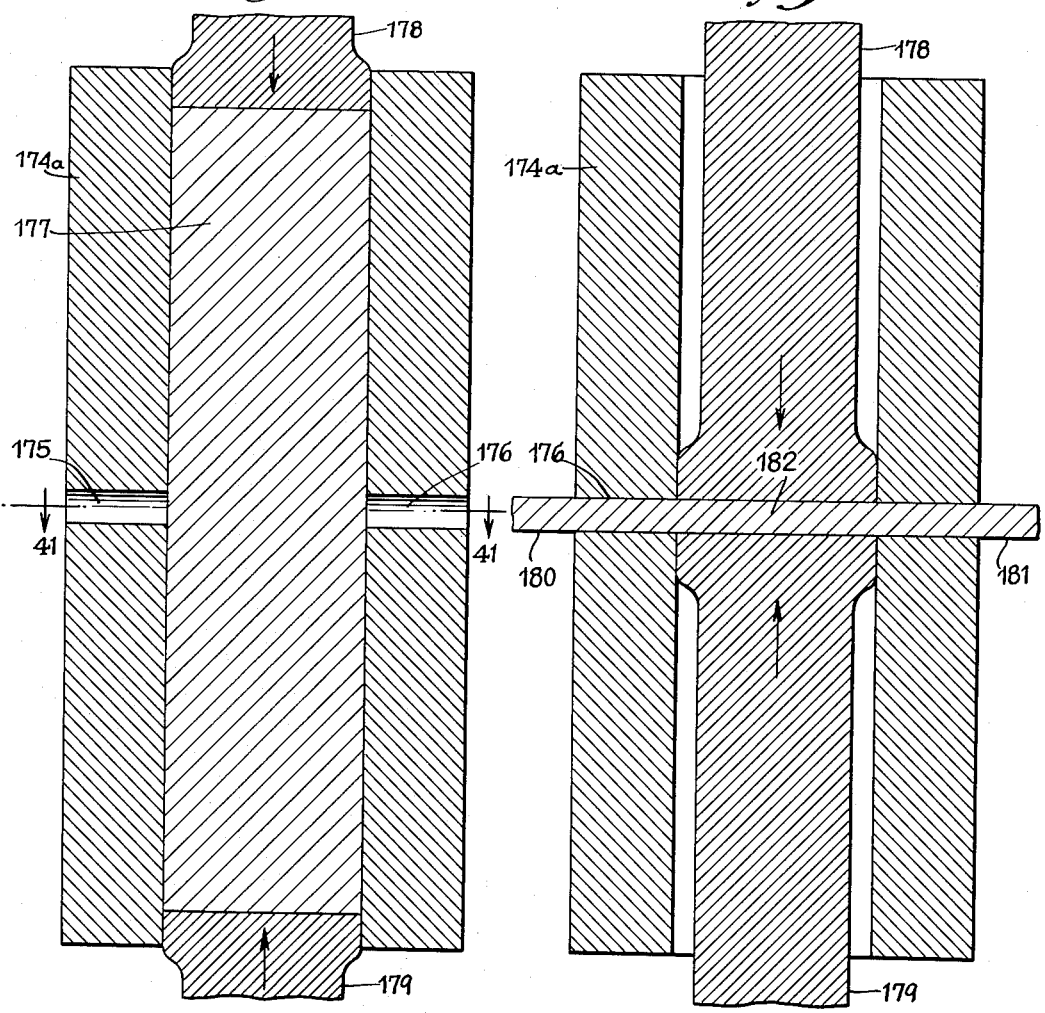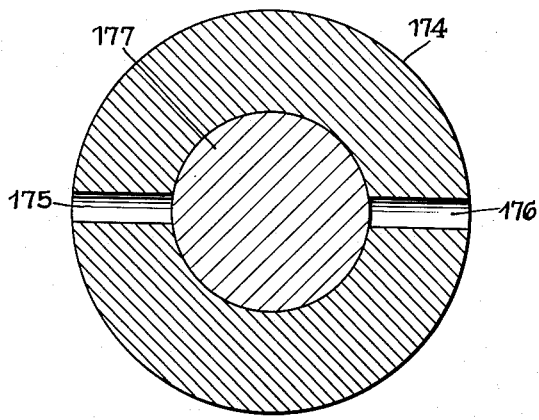

June 12, 1956  H. M. GERSMAN  2,750,034
METHOD AND APPARATUS FOR EXTRUSION OF PLASTIC MATERIALS
Filed June 15, 1951  16 Sheets-Sheet 14

INVENTOR.
HARVEY M. GERSMAN.
BY
Ward Crosby & Neal.
ATTORNEYS.

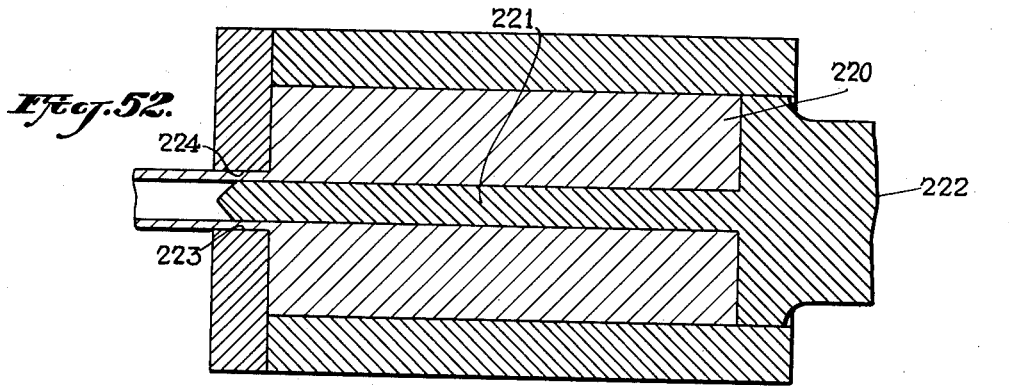
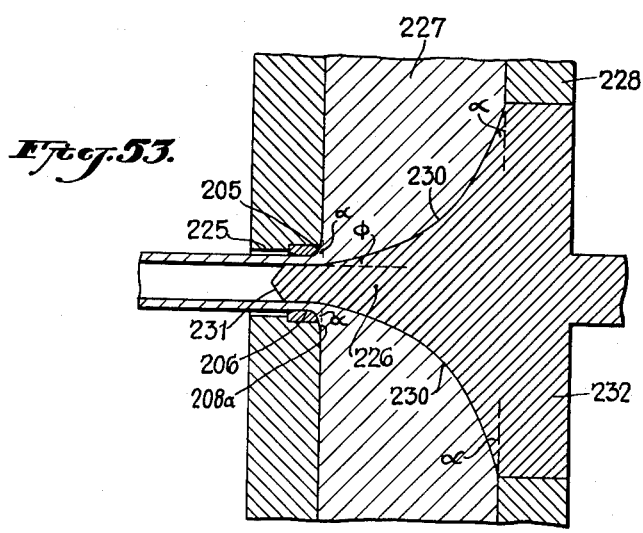
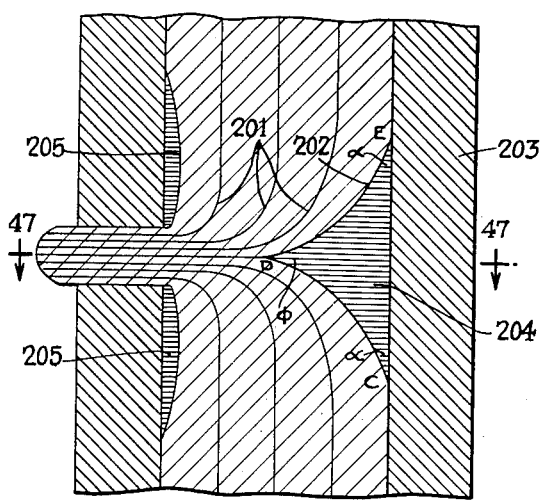
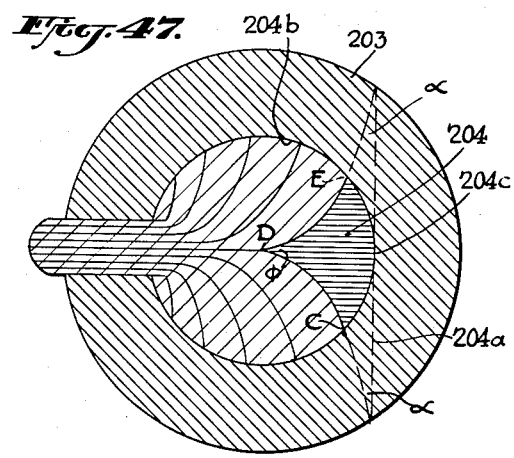

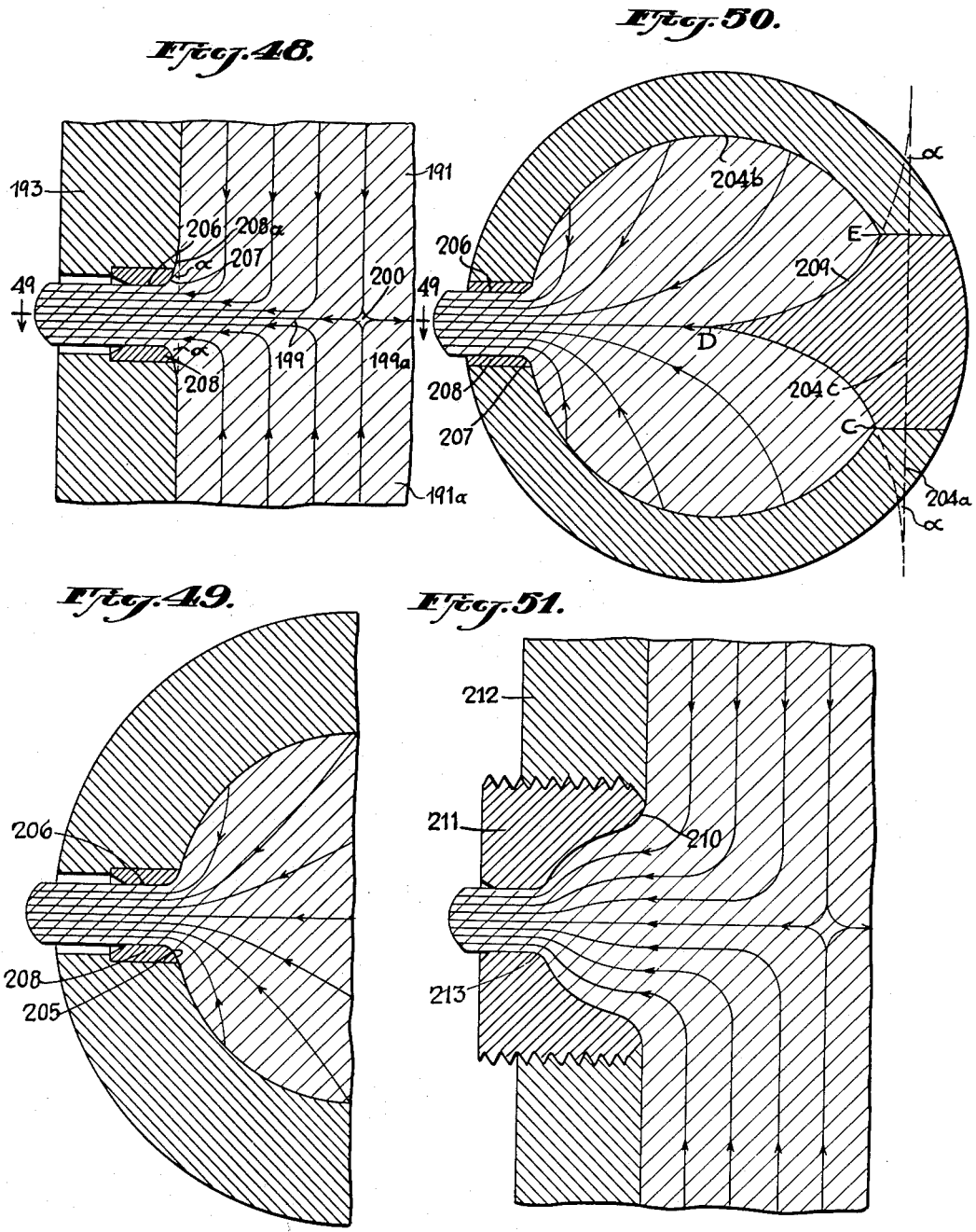

United States Patent Office 2,750,034
Patented June 12, 1956

2,750,034

METHOD AND APPARATUS FOR EXTRUSION OF PLASTIC MATERIALS

Harvey M. Gersman, New York, N. Y.; Chadot Byron Gersman, administratrix of said Harvey M. Gersman, deceased Application June 15, 1951, Serial No. 231,754

12 Claims. (Cl. 207—17)

This invention pertains to methods and apparatus for the extrusion of plastic materials, and more particularly for the extrusion of hard and refractory metals, heated to plasticity, such as metals of the iron group and alloys thereof, including carbon and alloy steels, such as stainless and high speed steels, also such metals as aluminum, magnesium and alloys thereof, and the like.

This application is a continuation-in-part of my copending application Serial No. 674,584 filed June 5, 1946 and now Patent No. 2,660,302.

A primary object of the invention is to provide extrusion dies for the purposes aforesaid, which are precisely contoured in accordance with the naturally occurring flow paths of any particular material to be extruded. A further object is to provide methods for determining said naturally occurring flow paths of a material to be extruded, and for conforming therewith, the extrusion cavity and orifice of a die for extruding such material.

A further object of the invention is to provide methods and apparatus, employing precisely contoured dies of the aforesaid character, for the direct, indirect and sidewall extrusion of plastic materials, including, for the sidewall modifications, properly contoured dies and cooperating rams for the extrusion of seamless tubes.

In the direct extrusion method of the invention, the apparatus employed comprises in its essentials a tubular extrusion chamber, closed at one end except for a die orifice, and open at the other end for slidable entry of a ram adapted to push and extrude a billet disposed within said chamber, in reduced cross-section through said orifice, the extrusion chamber and orifice being correctly contoured for non-turbulent and homogeneous direct extrusion of the billet material.

In the indirect method of extrusion in accordance with the invention, the apparatus employed comprises a tubular extrusion chamber which is wholly closed at one end, and is wholly open at the opposite end, the latter for entry of a ram having formed therein an extrusion orifice, for extruding through said orifice the material of the billet disposed within the chamber, as the ram is forced into said chamber against the billet. In this modification the surface of the ram engaging the billet and the orifice therein are contoured in accordance with the invention to provide non-turbulent and homogeneous indirect extrusion of the billet material.

In the sidewall method of extrusion, in accordance with the invention, the apparatus comprises a tubular extrusion chamber, open at one or both ends, and having one or more orifices, opening transversely through the sidewalls thereof. Extrusion of a billet disposed within the chamber is effected by means of a ram or rams entering one or both ends of the extrusion chamber. In this modification the die orifice or orifices are correctly contoured in accordance with the invention for the non-turbulent and homogeneous sidewall extrusion of solid bar stock, and in conjunction therewith, a correctly contoured ram is employed for the extrusion of seamless tubes.

The above and other novel features of the invention will best be understood by immediate reference to the accompanying drawings, wherein:

Figures 1–3 inc. are diagrammatic representations of conventional methods and apparatus for direct extrusion, these views illustrating in axial section a conventional type of tubular extrusion chamber closed at one end except for an orifice coaxial therewith and a ram displaceably entering the opposite end, these views further illustrating respectively, the successive steps involved in extruding a billet of metal or the like through the orifice.

Figures 4–7 inc. are drawings made from actual photographs, of products extruded with the conventional extruding apparatus of Figs. 1–3 inc., Figure 4 being a view in axial section of a partially extruded metal billet, Figure 5 a similar axial section of a clay billet prior to extrusion, and Figure 6 the same billet as partially extruded, while Figure 7 is a section of bar stock extruded by the apparatus aforesaid.

Figure 8 is a graphical analysis, illustrating the derivation of the "feed sector" portion of a properly contoured direct extrusion die, in accordance with the invention.

Figures 9 and 10 are diagrammatic views in axial section of a so-called "punch test" for deriving certain information required in the proper contouring of dies in accordance with the invention, Figure 9 illustrating the initiation of the test as a cylindrical punch is about to be axially pressed into a billet of a plastic material to be tested, while Figure 10 illustrates the condition of the billet after the punch has been impressed therein. Figure 11 is a view in axial section of one-half of a billet after being subjected to said punch test, this view being based on an actual photograph of a billet so tested. Figures 12 and 13 are graphical showings of the so-called "static zones" obtained from various materials when subjected to the punch test aforesaid.

Figures 14 to 17 inc. are graphical analyses illustrating the derivation from the punch tests aforesaid of the appropriate contouring of the orifice sector of properly contoured dies in accordance with the invention, for extruding any selected plastic material therefrom.

Figures 22 to 25 inc. are graphical analyses illustrating the derivation from the data of Figures 8 and 14 to 22 inc., of properly contoured complete direct extrusion die curves in accordance with the invention, including the feed curve, orifice sector and throat portions thereof.

Figure 26 is a view in axial section of a metal billet which has been partially extruded from a properly contoured direct extrusion die in accordance with the invention, this view being based on an actual photograph of a billet so extruded.

Figure 27:
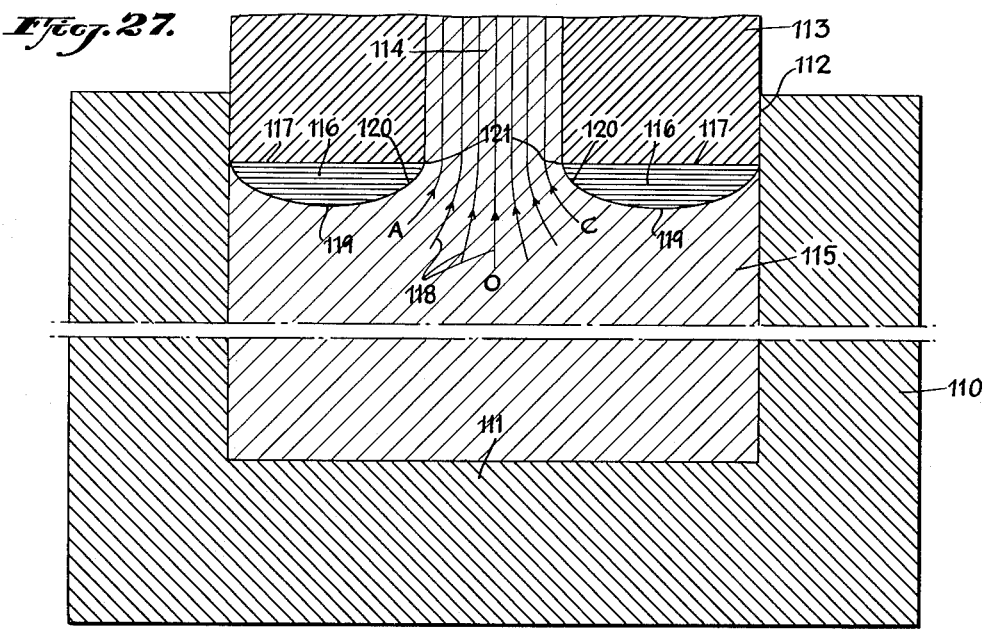
Figure 28:
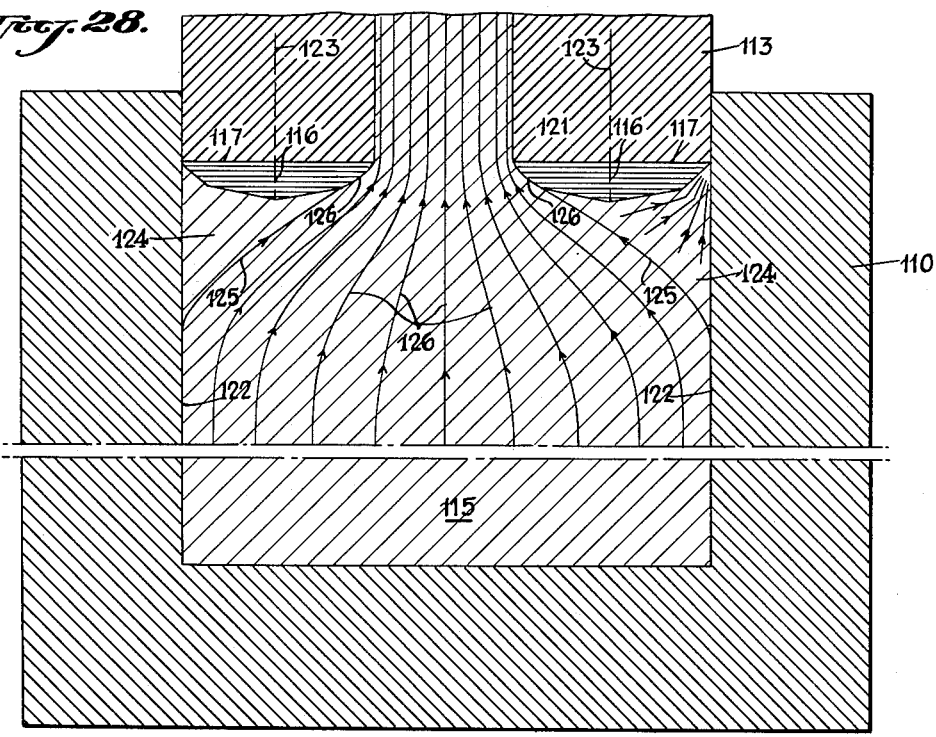

Figures 27 and 28 are diagrammatic views in axial section, of a conventional type of apparatus for the indirect extrusion of a plastic material, these views showing the extrusion chamber and associated orifice containing extrusion ram, in the initial and partial extrusion positions respectively.

Figure 29:
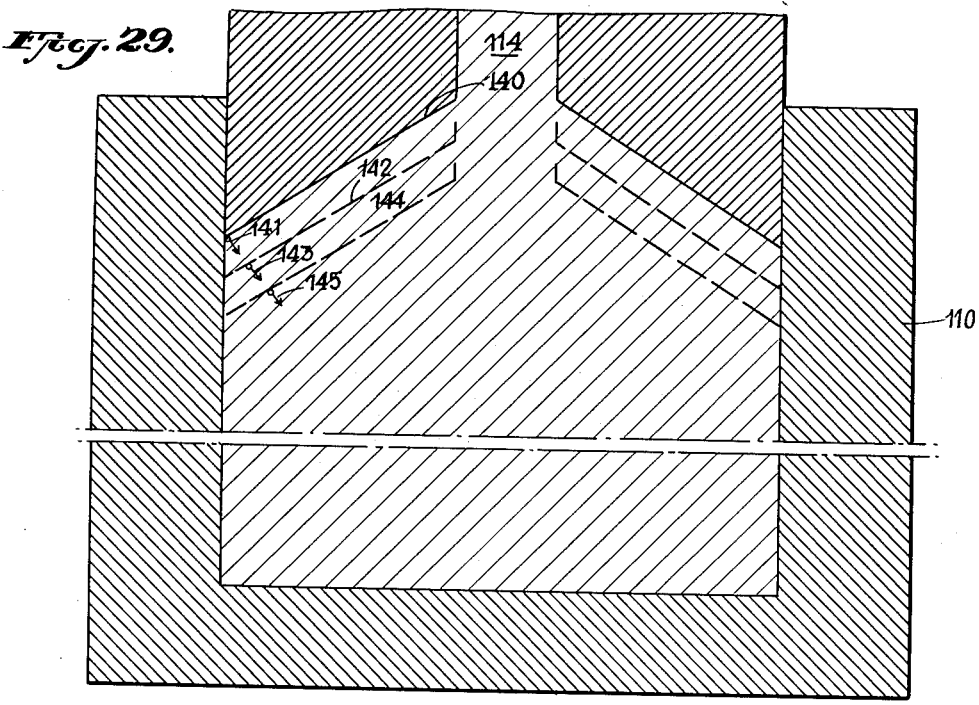
Figure 30:
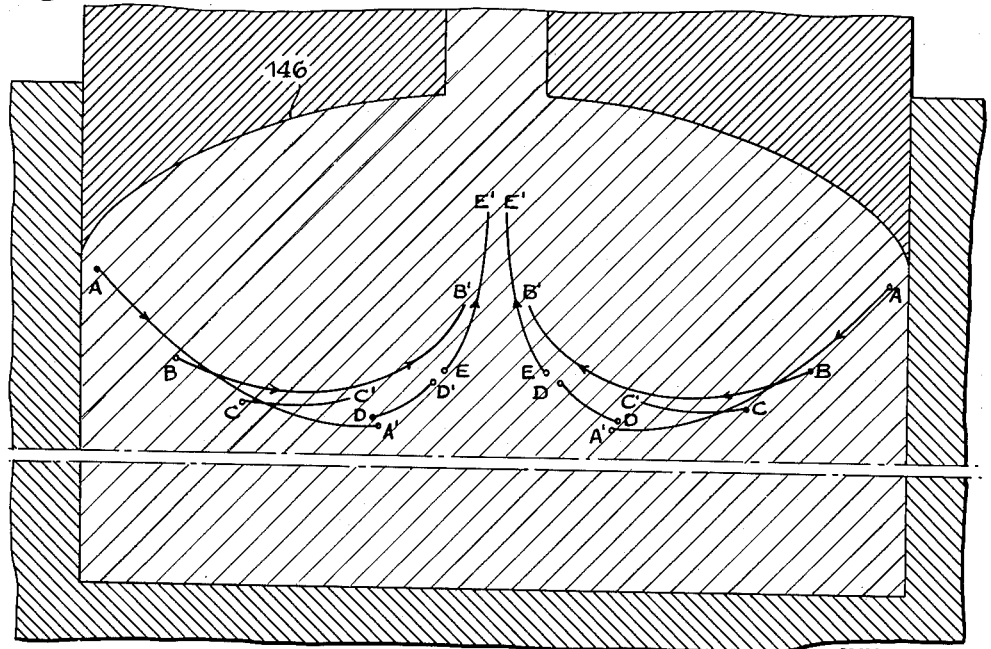

Figures 29 and 30 are diagrammatic views in axial section of two types of indirect extrusion apparatus, and illustrative of the flow paths of portions of the billet material during the extrusion operation, Figure 30 employing in the feed sector portion, a properly contoured indirect extrusion die in accordance with the invention.

Figure 31 is a graphical analysis, similar to Figure 8, illustrating the derivation of the feed sector curve of a properly contoured indirect extrusion die in accordance with the invention, and also comparing same with a similar curve for a direct extrusion die.

Figures 32 and 33 are graphical analyses, similar to Figures 22 to 25 inc., and illustrating in the same manner, the derivation of the complete die curve, for a properly contoured indirect extrusion die in accordance with the invention, including the feed curve, orifice sector and throat portions of the die.

Figure 34 is a view in axial section of a clay billet like that of Figure 5, which has been partially extruded in a conventional type of indirect extrusion apparatus such as that illustrated diagrammatically in Figures 27 and 28; while Figure 35 is a similar view of a metal billet which has been partially extruded by means of a properly contoured indirect extrusion die in accordance with the present invention.

Figure 36:
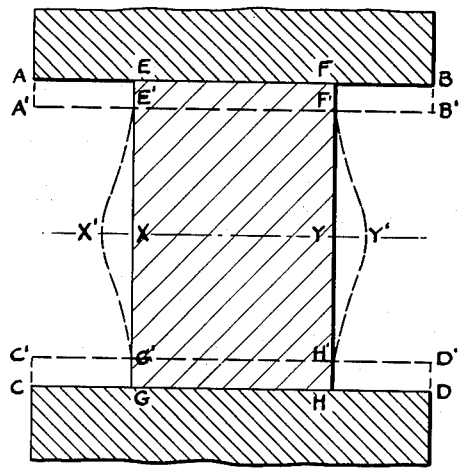
Figure 37:
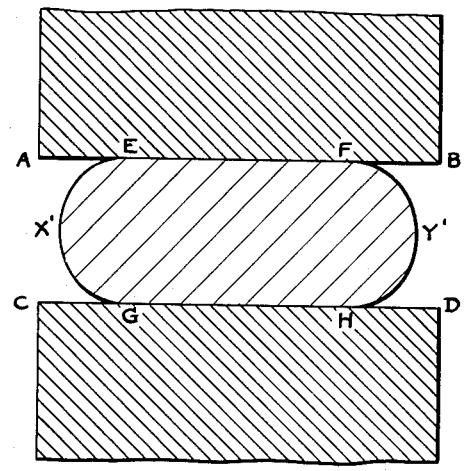

Figures 36 and 37 are diagrammatic showings in axial sections, of a metal billet when subjected to axial compression forces, these views illustrating successive steps of the resulting plastic deformation of such a billet when so compressed.

Figure 38:
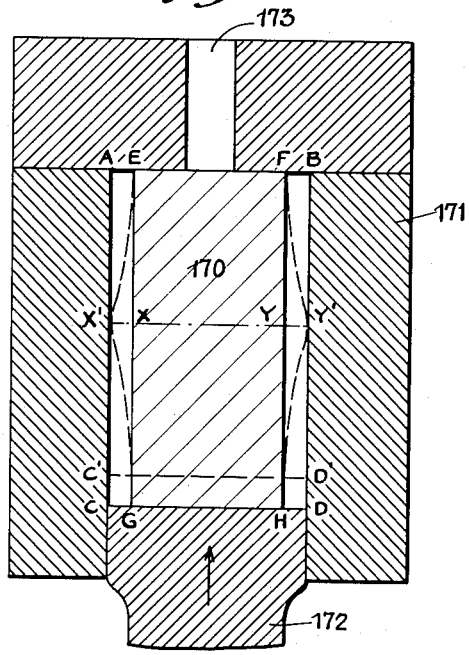
Figure 39:
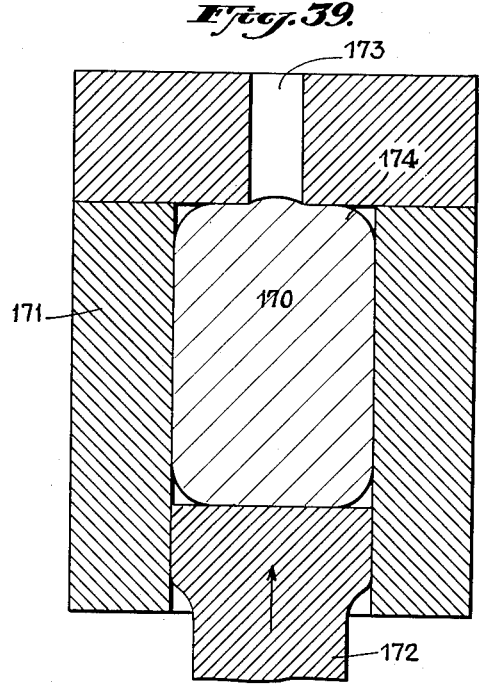

Figures 38 and 39 are views in axial section of a conventional type of direct extrusion apparatus such as that in Figures 1 to 3 inc., and illustrating the action of such apparatus in initially deforming a metal billet disposed therein, after the ram is initially forced into the extrusion chamber.

Figures 40 to 42 inc. are diagrammatic showings of a sidewall extrusion apparatus consisting of a tubular extrusion chamber, having therein oppositely disposed sidewall extrusion orifices, the chamber being open at both ends for the displaceable entry therein of a pair of extrusion rams, Figure 40 being a view in axial section of the apparatus at the initiation of the extrusion operation, Figure 41 a view in transverse section taken at 41—41 of Figure 40, and Figure 42 being a view of the apparatus in axial section at the completion of the extrusion operation.

Figure 43:
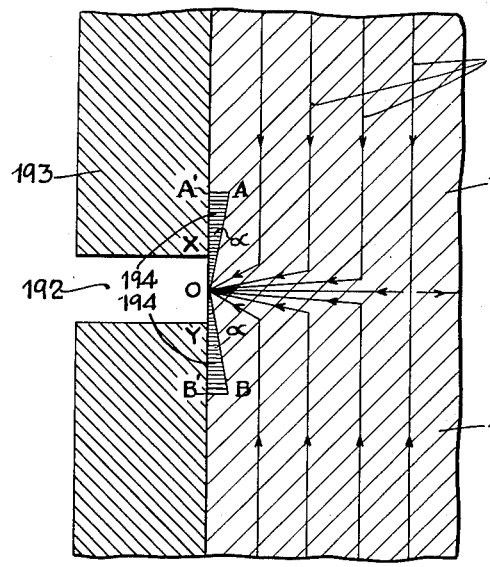
Figure 44:
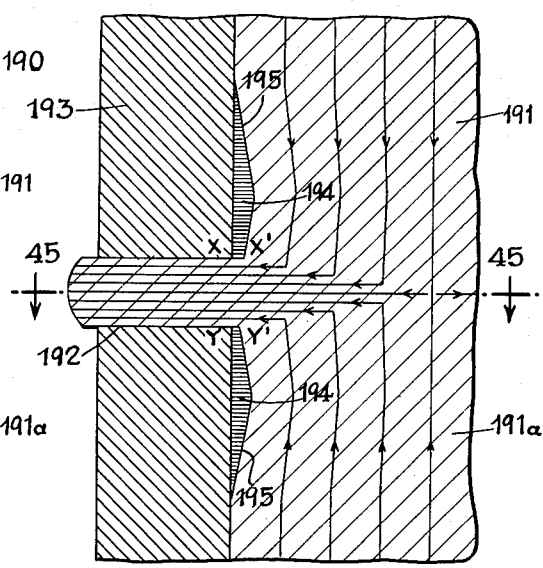
Figure 45:
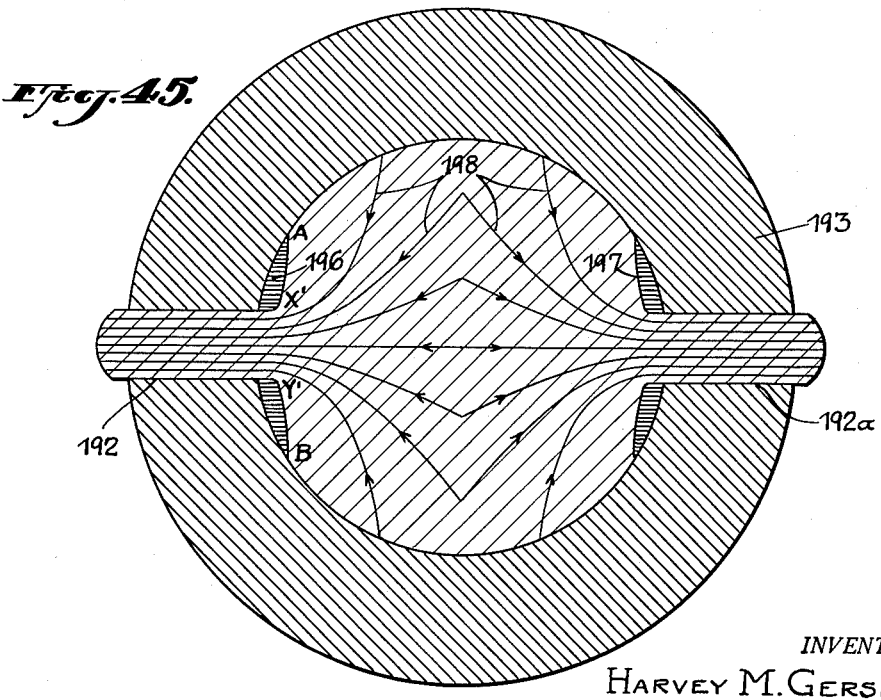

Figures 43 to 45 inc. are diagrammatic showings illustrating the flow paths of a billet material when subjected to sidewall extrusion through non-contoured dies, Figure 43 being a view in axial section of a portion of the extrusion apparatus, including an orifice thereof, this view illustrating the initiation of the extrusion operation, while Figure 44 is a similar view showing the conditions during extrusion, and Figure 45 a transverse section taken at 45—45 of Figure 44.

Figure 46 is a diagrammatic view showing in axial section, and Figure 47 a transverse section at 47—47 of Figure 46, of a sidewall extrusion apparatus containing a single extrusion orifice, and illustrative of the flow paths of an extruded billet material during the extrusion operation.

Figure 48 is a fragmentary axial extrusion elevation similar to Figure 43 of a sidewall extrusion apparatus employing a properly contoured orifice die in accordance with the invention, while Figure 49 is a transverse section, as taken at 49—49 of Figure 48. Figure 50 is a transverse section at the orifice axis, of a sidewall extrusion apparatus in accordance with the invention, containing a single extrusion orifice having therein a properly contoured orifice die in accordance with the invention, and having disposed in the opposite wall of the extrusion chamber, coaxial with the die, an axially displaceable insert member, which is properly contoured in accordance with the flow paths of the billet material to be extruded.

Figure 51 is a fragmentary view in axial section similar to Figure 48, of a modified form of sidewall extrusion apparatus in accordance with the invention employing a direct extrusion sidewall insert die.

Figure 52 is a diagrammatic showing, in axial section, of a conventional type of apparatus for extruding seamless tubes.

Figure 53 is a diagrammatic showing, in axial section, of a sidewall extrusion apparatus, in accordance with the invention, for extruding seamless tubes, this view illustrating a specially contoured mandrel in accordance with the invention, and insertable through the feed wall of the extrusion chamber opposite to that of the single extrusion orifice employed.

Direct extrusion

In Fig. 1 I show an extrusion die of a conventional type comprising an extrusion cylinder 10 consisting of a tubular extrusion chamber 11, closed at one end by a flat plate or disc 12, having formed therein a bore 13, coaxial with tube 11, and which functions as an extrusion orifice. Disposed within the tube is a cylindrical billet 14 of a metal to be extruded by means of a ram 15 acting against the lower end of the billet and displaceable within the tubular section 11 of the extrusion cylinder.

My investigations have shown that in such an extrusion, all movement or flow, up to the point where the finished part actually enters the orifice 13, takes place within the material of the billet itself. Therefore, those characteristics of the material which directly affect such internal flow, are the factors which govern an extrusion operation.

Since such characteristics are the direct result of the physical properties of the material, which in turn result from its particular analysis, they are immutable. Only one pattern of flow can result from any given set of physical properties, and only one die design can conform to this pattern.

This internal flow can be divided broadly into two parts, i. e., first, the actual movement into and through the orifice, and second, the movement within the billet to replace that material which has passed through the orifice. The first movement takes place within what I term the "orifice sector," shown in the drawing at AHB, and the second within what I term the "feed sector," which extends from DGF to the orifice sector. Together these two sectors form the flow zone of the billet. All flow within this zone is directed in a more or less radial direction to the apex O of the orifice sector.

At the inception of flow, movement towards the apex O begins along the line of least resistance, i. e. the center line OH of the orifice sector. Further movement towards O takes place through the feed and orifice sectors within such angular limits with respect to the walls of the extrusion chamber as will permit the billet material to slide within and upon itself. Each material has its own limiting angle for such internal flow. Beyond that angle sliding action or flow is not possible. Thus, the outer limits of the flow of the billet material from the side and end walls 11, 12 of the extrusion chamber, towards the apex O of the orifice sector, are set by the material itself.

In the Figure 1 showing, AOI and BOJ, represent this angular limit for the orifice sector, since these angles equal the minimum angle of internal flow of the billet metal with respect to the end wall 12 of the extrusion chamber. Thus there is no metal sliding action of the billet material within and upon itself within the shaded areas bounded by angles AOI and BOJ, the metal flow within the orifice sector being confined to the substantially spherical sector AHB.

To replace that material moving towards the apex O within this orifice sector, a general upward movement throughout the entire cross-section of the billet disposed below the orifice sector, is inaugurated. Within the feed sector, this movement is directed toward the orifice sector, and, if not interfered with, will cause the flow-section of this portion of the billet to extend to the orifice sector along certain flow paths or lines as described below, the beginnings of which are indicated at DGF and the endings at AHB. Below the feed sector DGF the billet is displaced as a unit upward by the ram with little internal flow.

Since, in the feed sector, the flow of billet metal is naturally diverted inwardly toward the orifice sector from the substantially flowless upward displacement of the billet as a whole below the zone DGF, the outer limits at which internal flow begins are again determined by the governing factor, i. e., the minimum angle of internal flow of the billet metal. This angle with respect to the sidewall of the extrusion chamber, is shown at CDK and EFL. Therefore, all feed flow of billet metal is confined within this limiting angle. Therefore, the material along zone DGF moves upwardly and inwardly between these constricting boundaries to the orifice sector AHB.

Referring now to Fig. 2, when actual flow begins, the billet material within the orifice sector AHB turns from its path towards its apex O and moves out through the orifice 13 to form the extruded rod 16. The actual orifice consequently lies below the orifice 13 and within the billet material, in the region indicated at 17 and 18, below the lower corners 19 and 20 of the orifice, and along the natural flow path of the extruded material in turning these sharp corners, as discussed more in detail below. Only that portion of the billet lying within the angles AOI and BOJ of minimum internal flow of the metal, is in direct contact with the orifice edge 19, 20, of the die itself.

As the material within the orifice sector AHB passes through the orifice, other billet material within the feed sector moves forward as replacement. This action causes the metal flow to be initiated along the lower region DGF of the orifice sector and to flow inwardly toward the orifice within the limits established by the angle KDC and EFL of minimum flow of the billet metal with respect to the sidewalls 11 of the extrusion chamber. The metal flows thence to the orifice sector AHB along the intervening flow paths indicated generally at 21, the precise configurations of which will be derived below.

This flow from the beginning DGF of the feed sector to the orifice sector AHB is substantially confined within a surface of revolution, bounded by the outermost paths of flow indicated at 22 and 23. This flow along the boundaries 22, 23, produces a shearing action of the metal within the billet itself, thus more or less isolating the flow zone 21, 22, 23, from the remaining upper corner portions 24, 25 of the billet, indicated by the shaded areas, which portions remain relatively static during extrusion. The harder the material of the billet being extruded, the closer this shearing action approaches to an actual separation of metal components along the boundaries 22, 23. The temperature of the billet must be sufficiently high and the power applied to the ram sufficiently great to produce this internal shearing action of the metal, if extrusion is to be effected with an extrusion die of the construction shown in Figs. 1 and 2.

Referring to Fig. 3, the shaded corner zone portions 24, 25 of the billet, which have in effect been isolated or sheared away by the formation of the flow zone 21—23, do not remain completely static, and hence cannot be utilized as a self-forming feed surface for the die. The reason is that although this zone 24, 25, remains relatively static compared to the flow zone, 21—23, it nevertheless undergoes a slow, mass-movement of this entire section, as a result of the pressure to which it is subjected between the flow zone metal 21—23 and the upper die plate 12. The rate of flow of this mass-movement of this zone 24, 25, is considerably slower than that of the material within the flow zone 21—23.

Because of this squeezing action, a portion of the mass in the zone 24, 25, moves slowly along the inner face of the die plate 12, as at 17, 18, and is thus slowly extruded in the form of an outer shell or layer 26 enveloping the core portion 27, supplied from the flow zone 21—23, of the resulting extruded rod 16. This slowly extruded outer layer is composed of a relatively unworked mass, which adheres only loosely to the core material 27, and is in no way comparable in quality and physical properties to the core material. It is for this reason variously referred to as "extrusion pipe" or "extrusion defect."

Since the rate of extrusion of this outer layer 26 is so much slower than that of the core 27 supplied from the flow zone, the outer layer tends to surface check or crack, the cracks thus initiated tending to penetrate into the core portion 27, often resulting in corresponding cracking and even complete rupture therein. Also by reason of its slow mass-movement, the material extruded from the static zone 24, 25, tends to accumulate in the vicinity of the orifice, and thus gradually to constrict the orifice sector of the flow zone to an ever increasing degree. In consequence the thickness of the extrusion pipe 26 tends gradually to increase as the extrusion proceeds, and in the manner indicated at 26 of the drawing. Conversely the diameter of the good core material 27 of the extruded part 16, is correspondingly and progressively decreased as shown.

The harder the material being extruded, the weaker is the mechanical bond between the outer layer 26 and the core material 27. As a result no extruded section embodying this "pipe" effect is sound, so that this pipe must be removed by centerless grinding or the like, down to the core material 19. Quite frequently the static zone material 24, 25, instead of being extruded as a continuous outer layer 26, is intermittently extruded in the form of separated blobs or ridges peripherally surrounding the core material, as discussed below with respect to an illustrative figure of the drawings.

As part of this isolated corner mass 24, 25 emerges through the orifice, the balance moves forward as replacement. This causes some of the material of the flow zone, along the boundaries 22, 23, to be squeezed axially upward beyond the limits of the flow zone, to in turn replace the slowly moving, isolated corner zone mass 24, 25. This causes a continual distorting of the normal flow within the flow zone together with a constant repetition of the previously described shearing action along the boundaries 22, 23, thus preventing these boundaries from becoming an effective self-forming die surface.

Since those portions of the billet lying below the feed zone DGF flow toward the orifice along the flow lines 21, and since these lines emerge from the die orifice on the interior of the extruded section 16, scale and other surface defects of the billet are found as inclusions within the extruded section as well as in the surface pipe 26. Such inclusions naturally render the part unsound.

Perhaps the most harmful result of this movement of the isolated corner mass 24, 25 is its effect upon the die. Since all of its motion is the result of the flow zone compressing it against the inner face of the die plate 12, which thus blocks its natural axially forward flow, the resulting lateral movement towards the die orifice assumes a slow, inexorable, glacier-like action, constantly seeking to push the die from its path, thus gouging, scouring and abrading the die face and orifice edge 19, 20, as it progresses.

The harder the material and the higher the temperature the more severe is this action. Thus, while with the various low-temperature, non-ferrous materials, the cost of such die destruction can be absorbed it renders ordinary extrusion of ferrous or other hard metals and alloys commercially impractical. No factors contributing to or causing such excessive die wear, gouging or abrasion, can be attributed to the action of the metal of the flow zone 21—23, for at no point is the metal of this zone in direct contact with the die plate 12.

By way of experimental substantiation of the extrusion effects above discussed with reference to Figs. 1–3 inc., and employing an extrusion die of the type set forth therein, reference will now be had to Figs. 4–7 inc. of the drawings.

Fig. 4 is a drawing from an actual photograph, of one-half of a partially extruded aluminum alloy billet, produced in the following manner: A cylindrical billet of this material was first cut axially in half, and one of the opposing plane faces of these sections was axially and transversely cut with spaced parallel grooves, so that this surface had the initial appearance of a checkerboard. The two billet halves were then fitted together and welded along the edges. The resulting billet was then placed in an extrusion die in accordance with Fig. 1, and partially extruded in the manner illustrated in Figs. 2 and 3. The billet was thereupon removed from the die and the two halves split apart, with the result illustrated in Fig. 4.

A comparison of this figure with the illustrative sketches of Figs. 2 and 3, will fully confirm the flow action of the metal above discussed with reference thereto. It will be observed that there is a relatively sharply defined minimum angle as indicated at 30, 31, at which the billet metal flows away from the sidewalls of the die toward the extrusion orifice, and that it flows thence along the relatively sharply defined flow paths 32, 33, 34, to the orifice, producing thus a feed zone boundary 32, 33, comprising a concavely shaped surface revolution which cuts or shears its way through the relatively static corner zone metal 35, 36, contiguous to the upper die plate. Within the flow zone boundaries 32, 33, all of the metal of the billet flows within the feed zone sector in continuously curved flow paths 32, 34, which gradually converge to the orifice, passing thence therethrough to form the extruded bar 37. The drawing also clearly brings out that although there was relatively little movement of the isolated corner zone material, 35, 36, nevertheless there was a slow mass movement thereof toward the orifice, as shown by the elongation and distortion of the checker squares in that direction. As above explained the feed zone boundaries 32, 33, are not too sharply defined due to the continual upward shifting of a portion of the flow zone material to replace that of the static zone 35, 36, passing through the die orifice. For that reason the billet itself cannot function effectively as a self-forming die.

Referring now to the test results of Figs. 5 and 6, in this experiment a cylindrical billet was made of clay, comprising a core 40, of dark clay and an outer layer 41, of white clay. This billet was then placed in an extrusion apparatus such as that illustrated in Fig. 1, partially extruded as in Figs. 2 and 3, thereupon removed from the die and cut axially into two halves, with the result illustrated in Fig. 6 which shows one of the halves in axial section.

It will be observed from this remarkable experiment that a portion of the white clay outer layer 41 has established a concavely shaped flow zone, as at 42, 43, which has cut or sheared its way entirely through the black clay interior portion 40, to and through the extrusion orifice, thus completely isolating the relatively static corner zone portion 44, 45, of dark core clay abutting the upper die plate.

It will be noted that in the extruded rod 46 the black clay from the flow zone 47 forms the innermost core 48, surrounding which is a layer 49 of the white clay from the flow zone 42, 43, and enveloping this is an outermost layer of black clay 50 extruded from the relatively static corner zone 44, 45. This experiment accordingly provides conclusive confirmation as to the theory of extrusion above expounded with reference to Figs. 1–3 inc.

Fig. 7 shows a section of a steel rod extruded from a billet, employing an apparatus similar to Figs. 1–3 inc., and illustrates the above-mentioned effect wherein the extrusion of the pipe from the static corner zone occurred intermittently, to form isolated ribs or ridges, as at 51, extending peripherally about the core portion 52.

In order to provide scientifically correct mechanical conditions for extrusion, the die contour must coincide with the outer contour of the natural flow zone of the material to be extruded. With the internal shearing action thus eliminated, heat and power requirements are reduced. With no sheared section forcing its way into the orifice, as in Fig. 6, extrusion pipe and inclusions are eliminated, and sound clean parts are produced, with uniform working of the material in the extruded portion, and proportionate reduction throughout. With the glacier-like mass movement along the upper face of the die, as in Figs. 1–3, inc., eliminated, the factors damaging the die are likewise eliminated, for if the path of natural flow of the billet material coincides with the contour of the die, a minimum of scouring and abrasion occurs, thus bringing extrusion of even the hardest and most refractory metals within the commercial range.

To accomplish the correct contouring of the die, the naturally occurring and theoretically correct configuration of the flow zone must be developed from the sidewalls of the extrusion chamber, to, into and through the die orifice.

My investigations establish that the outer contour 22, 23, Fig. 2, the flow zone, 21—23, of a correctly contoured die, is somewhat comparable, subject to the limitations noted below, to the velocity curve for the flow of liquids through pipes. In hydraulics this curve is established by measuring the speed of flow of various sectors of equal volume, encountered in passing from the inner surface to the axis of the pipe, or vice versa.

In extrusion, however, we are dealing with bodies, which, although plastic and viscous, are not true liquids. Accordingly, the variation in the extent of forward motion of the various sectors of equal volume aforesaid is controlled, as above explained, by the minimum angle of internal flow of the plastic material. Any force or condition destroying this control results in rupture and turbulence of the metal during extrusion.

Therefore, the angle at which the theoretically correct flow zone of the material diverges from the sidewalls of the extrusion chamber must be equal to the minimum angle of internal flow of the material to be extruded, which angle varies within a fairly small angular range as established below, for different types of analyses of materials.

My investigations further establish that commencing at the sidewalls of the extrusion chamber with this minimum angle of internal flow of the plastic material, that the flow path for the feed sector of the die extends thence toward the apex O, Fig. 1, of the orifice, in accordance with an arithmetic progression of terms representing equal concentric volumes to be displaced during extrusion, this curve corresponding substantially to the formula:

(1)     $\gamma = \phi + (n_a - 1)\beta$ wherein $(n_a)$ is the number of such equal volumes encountered between said die sidewalls and a point on said curve, gamma is the angular slope of said curve at said point thereon with respect to the die axis, beta the angular increment by which said slope is changed in passing from one said volume to the next, and phi is the angle at which said curve diverges from said sidewalls, namely, the minimum angle of internal flow of the metal.

As explained below, this critical angle of minimum internal flow of the billet material is determined by a punch test, in which a cylindrical punch is forced axially into a block of the material to be extruded, the angle in question being determined from the zone of static metal which the punch displaces without, however, producing any flow of material therein. Also, as explained below, this punch test determines the theoretically correct contouring of the orifice sector of the flow zone of the die, that is, the sector which tangentially links the feed sector with the orifice. This orifice sector is of convex curvature and more specifically of a parabolic curvature in axial section.

My investigations further establish that the aforesaid arithmetic progression curve for the feed sector of the die would, if continued to the apex O, Fig. 1, of the die orifice, intersect the horizontal line IJ thereat, also at the minimum angle of internal flow of the metal. Thus, both terminal angles of said feed sector are established, which in turn, establishes the specific contour of the intervening arithmetic progression curve of the feed sector, from the die sidewalls to the region at which it coalesces with the orifice sector, the latter as explained below.

Referring now to Fig. 8, a cylindrical billet shown generally at 55 in axial section, with its base diagrammatically developed, as at 56, and having an outside radius $\gamma$ and of height $h$, is theoretically divided into a total of $n_T$ sections of equal volume, such as 57. With this development the theoretically correct feed sector of the flow curve may be computed from the above formula. However, in computing and plotting the feed sector curve it is much more convenient to start at the orifice apex O, treating the billet axis 58 and a line 59 lying in the upper plane face of the billet, as the $y$ and $x$ axes, respectively, of a rectangular system of coordinates, and to compute the feed curve in accordance with the following equation which is the converse of Equation 1, but results in the same curve for the feed sector, viz.

(2) $\quad$ delta = alpha + $(n-1)$ beta wherein alpha ($\alpha$) is the angle between the $x$ axis and the feed curve 60 at the orifice apex O, $n$ is the number of equal volumes disposed between the $y$ axis and any point 61 on the feed curve, beta ($\beta$) the angular increment of constant magnitude by which the slope of the feed curve 60 is changed in passing from any volume position such as $n$ to that next adjacent such as $n+1$, while ($\Delta$) is the slope of curve 60 at said point thereon with respect to the $x$ axis. Phi ($\phi$) is the angle at which the feed curve 60 intersects the outer surface of the billet at D.

As the feed curve 60 is traced from O to D, its angular slope delta increases from a starting angle of alpha to a final angle of $\pi/2$ — phi. Substituting this final angle in Equation 2 gives gives for the value of beta (3) $\quad$ beta $= \dfrac{\pi/2 - \text{alpha} - \text{phi}}{n_T - 1}$ Thus assuming the angles alpha and phi to be known for the material of the billet, the feed curve 60 may easily be computed and plotted by substituting in Equation 2 the value of beta from Equation 3, for any arbitrarily selected number $n_T$ of equal volumes into which the billet is divided.

It will be understood, of course, that in an extrusion die having the theoretically correct contour for the flow surface, the feed sector thereof will comprise a surface of revolution having in axial section the configuration of curve 60.

In order to develop the curve 60 as a continuous function of the $x$, $y$ coordinates, the total number of equal volumes into which the billet is divided may be made very large, approaching infinity, in which case, the radial width 62 of any of the equal volume sections will become correspondingly small, equaling the derivative $dx$ in the limit, from which the radial distance $x$ to any volume $n$ equals $ndx$, so that (4) $\quad n = x/dx$ Also the volume of each sector of equal volume will become $2\pi x dx h$, and the total billet volume $\pi r^2 h$ of the billet will also equal $2\pi x dx h n_T$, from which (5) $\quad n_T = r^2/2x dx$ Substituting in Equation 3 above and neglecting the numeral 1 which is negligible compared to $n_T$ (6) $\quad$ beta $= (\pi/2 - \text{alpha} - \text{phi}) 2x dx/r^2$ Substituting (4) and (6) in (2) gives (7) $\quad$ (delta — alpha) $= (x/dx - 1)(\pi/2 - \text{alpha} - \text{phi})\dfrac{2x dx}{r^2}$ Expanding, multiplying through by $dx$ and neglecting second order or $dx^2$ components as negligibly small in comparison with first order or $dx$ components, gives (8) $\quad$ (delta — alpha)$dx = \dfrac{2x^2 dx}{r^2}/r^2(\pi/2 - \text{alpha} - \text{phi})$ Integrating and knowing that delta equals alpha when $x$ equals zero gives (9) $\quad$ delta $=$ alpha $+ \dfrac{2x^2}{3r^2}(\pi/2 - \text{alpha} - \text{phi})$ or

(10) $\quad dy/dx = \tan\left(\text{alpha} + \dfrac{2x^2}{3r^2}(\pi/2 - \text{alpha} - \text{phi})\right)$ or $dy/dx = \tan(\text{alpha} + \tfrac{2}{3}(90° - \text{alpha} - \text{phi})X^2)$ where $X$ equals $X/r$, i. e. the ratio of any abscissa to the curve to the radius of the billet.

(11) $\quad y = \int_0^r \tan\left(\text{alpha} + \dfrac{2x^2}{3r^2}(\pi/2 - \text{alpha} - \text{phi})\right)dx$ If, as is the fact with direct extrusion, alpha equals phi, then the fundamental formulas for the shape of the die feed sector become,

(12) $\quad dy/dx = \tan\left(\text{alpha} + \dfrac{2x^2}{3r^2}(\pi/2 - 2\,\text{alpha})\right)$

(13) $\quad y = \int_0^r \tan\left(\text{alpha} + \dfrac{2x^2}{3r^2}(\pi/2 - 2\,\text{alpha})dx\right)$ Having thus established the theoretically correct configuration of the feed sector in terms of the radial distance to any point thereof, the outside diameter of the billet, i. e. internal diameter of the extrusion chamber, and the angle alpha of minimum internal flow of the metal to be extruded, attention will now be directed to determination of the magnitude of alpha for any particular material to be extruded.

In addition to determining the angle of minimum internal flow for each material to be extruded, it is also necessary to learn the contour and extent of the flow curve assumed by the material when turning from the feed curve sector into the orifice. I have devised a simple test which provides this information.

I have discovered that when a punch is inserted into a plastic metal body, it carries before it, throughout its travel, a certain portion of the metal originally encountered. I have found that the contour of this static portion determines the very factors above referred to.

The punch test is carried out as follows: A billet of the material to be extruded is cut axially in two halves, and a series of spaced, parallel and axially extending grooves cut in the plane, sectioned surface of one half. The halves are then fitted and welded together, and a cylindrical punch forced, axially therein and withdrawn, and the halves thereupon split apart, to permit of examining the resulting distortion of the grooves referred to, as a result of embedding the punch in the billet metal.

Figure 9:
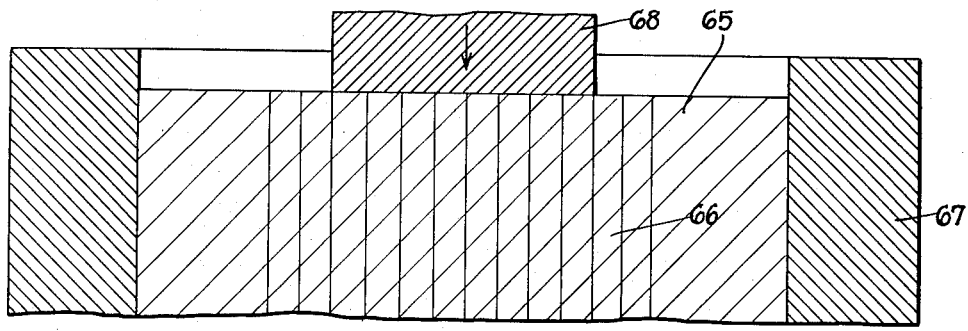

Thus referring to Fig. 9, each half 65 of the billet bearing on its sectioned face the parallel grooves 66, has opposed thereto the opposite half of the billet, these two halves being inserted in a tubular retaining member 67, and a cylindrical punch 68 forced axially into the billet.

Figure 10:
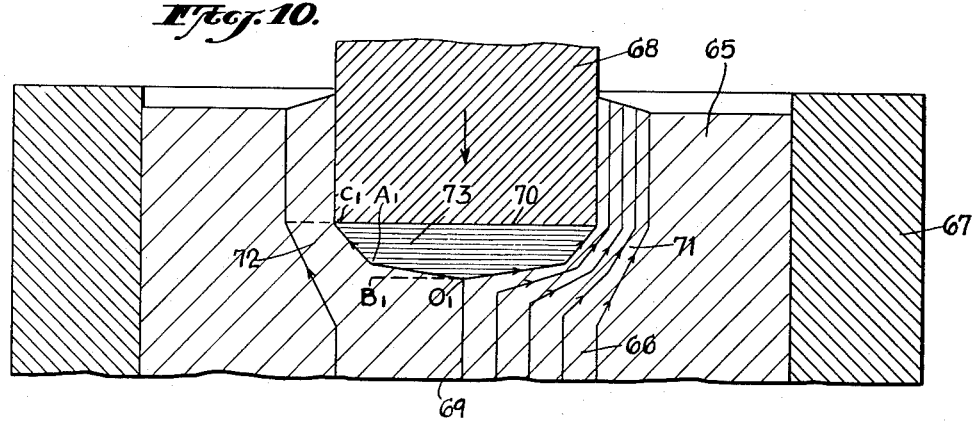

Fig. 10 shows the punch thus pressed into the billet. Referring to the initially parallel grooves 66, as the punch enters the billet, it displaces an amount of material equal to its volume. Starting on the center line 69 of the punch and billet, the displaced billet metal flows radially outward in all directions about the lower face 70 of the punch, towards and about its lower peripheral edge $C_1$, in the manner illustrated by the resulting distortion in the grooved lines, as at 71, 72. This represents internal flow of the billet metal, portions of which slide upon each other at progressively lesser angles until it reaches the minimum angle along which the metal will slide within itself. The line $O_1A_1$ represents such a final flow line, and the angle which this line makes with the horizontal $O_1B_1$ constitutes the minimum angle of internal flow of this particular billet material, this being the angle $A_1O_1B_1$. The button-like section of metal 73 just beneath the punch, and comprising the shaded portion, represents the amount of static billet material which is carried down with the punch. None of the metal within this shaded portion will flow, because, in order to do so it would have to flow at an angle less than the minimum flow angle $A_1O_1B_1$, which as stated, is an impossibility. In this way the minimum flow angle is determined from the punch test.

Fig. 11 is a drawing from an actual photograph of a punch test made, in the manner aforesaid, on a billet of 18—4—1 high speed steel, the numerical designations on which corresponds to those of Figs. 9 and 10, numeral 74 designating the cylindrical hole formed by the punch. From Fig. 11 it will be seen that actually the static zone 73 is of continuously curved contour, as at 75.

Fig. 12 shows at 76–79 inclusive, one-half of the static zone 73, Fig. 11, resulting from similar punch tests performed on the various materials designated. It will be seen that these punch test static zones are different for different materials, and that the flow characteristics of each material are uniquely determined thereby.

Reverting to Fig. 10, the line A1, C1 approximates the flow path of the displaced material around the lower peripheral edge C1 of the punch, and its length, angle, and shape, is governed by the minimum curvature required by that quantity of the given material "to turn that corner." This action is directly comparable to the flow of material in turning from the feed curve sector into the orifice of an extrusion die. This establishes the true and only minimum curve along which that particular material will turn a corner. This provides the orifice curve data.

Fig. 10 illustrates this action by means of straight lines approximating the precise flow curve. Actually, however, as above pointed out with respect to Fig. 11, the static zone 73, resulting from the punch tests, is of continuously curved contour, as at 75, Fig. 11.

Figure 13:
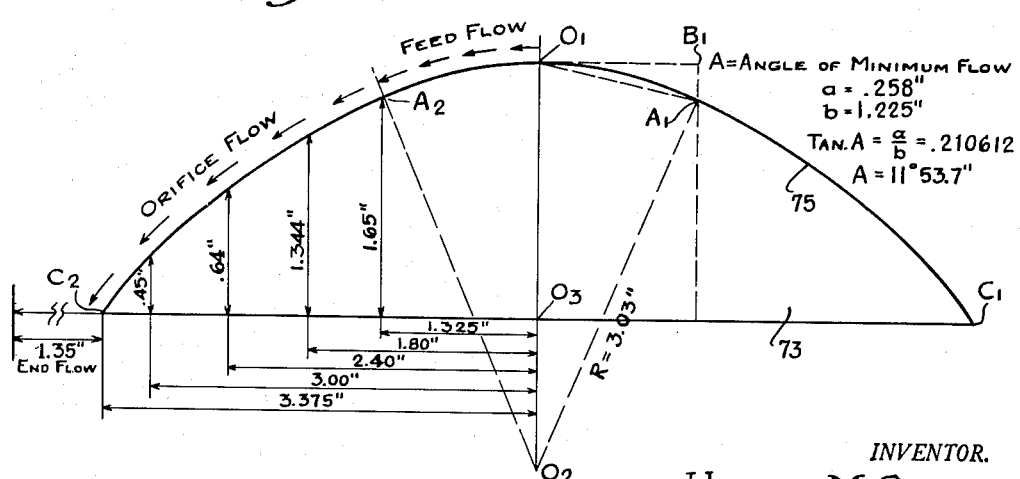

Fig. 13 shows the outline of the static zone for a punch test made on a billet of medium carbon steel, and is plotted in sufficiently large dimensions to permit of analyzing the continuously curved boundary 75 thereof. I have discovered, from analyzing punch test curves of this sort, obtained from numerous materials, that the central sector A1, A2 is always a true sector of a sphere, or, in axial section as in Fig. 13, is a true arc of a circle, having a radius O1, O2, the center of the circle being on the center line or axis of the punch at O2. The remainder of the curve 75, comprising the sector A1, C1, A2, C2, which is the orifice curve portion, is tangent, as at A1 and A2, to the central arcuate sector A1, O1, A2, and is of substantially parabolic contour. As above stated, the angle of internal flow of the material, is the angle B1, O1, A1, between the perpendicular O1, B1 to the axis O1, O2, and a line drawn from O1 to the point of tangency A1.

From the data obtained on punch test curves of the character illustrated in Figs. 11–13 inc., supplementing that for the feed sector curve derived as above, the correct flow curve contour for the complete die may be determined in the manner now to be discussed with reference to Figs. 14–18, inc.

This derivation starts from a true punch test curve 75, Fig. 14. From the aforesaid points of tangency A1, A2 thereon, perpendiculars A1, D1 and A2, D2 are drawn to the base 70 of the static zone 73. This divides the static sector, into the two orifice sectors A1, C1, D1 and A2, C2, D2, and the feed sector A1, A2, D2, D1. The determination of the size of the orifice sector A1, D1, C1, for any particular orifice dimension, will determine the size of the orifice curve thus required.

Fig. 15 shows the punch test curve of Fig. 14, laid out diagrammatically in straight line segments. Line O1, A1, which is determinative of the minimum flow angle, has a length which is always proportionate to the depth O1, O3, of the axial center of the static zone 73. Line $xy$ represents an extension of O1, A1 to the point of intersection at $x$, with the line $xz$, which later coincides with the base 70 of the static zone. Thus the angle $zxy$ is equal to the angle of minimum internal flow A1, O1, B1.

The length of A1, D1 is also always proportionate to the length O1, O3. The angle A1, C1, D1 is fixed, i. e. constant for any particular material, so that the length D1, C1 is always proportionate to the length A1, D1.

Fig. 16 is a duplicate of Fig. 15, except for being of reduced proportions throughout, to illustrate the application of the Fig. 15 data to an orifice of smaller dimensions than that to which Fig. 15 would apply. It will be noted, however, that in passing from the graph of Fig. 15 to that of Fig. 16, that the minimum flow angle $xyz$ and the angle A1, C1, D1 remain unchanged.

It is evident, therefore, that the size of the orifice sector A1, C1, D1 is dependent upon the length of the line O1, O3, and that this also serves to fix the point C1 on the line, $xz$. Since, however, the angle A1, C1, D1, is fixed for any particular material to be extruded, and since O1, O3 is proportional to A1, D1, the length and location of O1, O3, in relation to any point C1, on the line $xz$ can be determined, if the angle A1, C1, D1, is known. This means that for any point C1, the size of the entire punch test curve, and consequently the size of the orifice sector A1, C1, D1, can be accurately determined. Translating this into the true punch test curve as shown in Fig. 14, the orifice curvature around any point C1 on the line $xz$ is established.

As was above explained with reference to Fig. 8, the approach of the feed curve 60 to the apex O of the billet, is always along the minimum flow angle alpha. This corresponds to the angle $yxz$ of Figs. 14–17 inclusive. The true orifice approach surface curve begins on the feed curve approach line $yx$, in connection with which, as has been shown above with reference to Figs. 14–16 inclusive, the punch test curve always fits within the minimum flow angle $xyz$, in the manner illustrated in these figures.

Let C1, a point on line $xz$, represent one edge of the orifice, with C1, $x$, thus representing the radius of the orifice opening with respect to the apex O of the billet. The curvature to C1 of the orifice approach surface from the feed line $xy$ must follow the curve A1, C1, Fig. 14, of the punch test curve, within the confines of the lines $xz$ and $xy$, and commencing at C1. Laying out the correct angle A1, C1, D1, from the point C1, the intersection of the line A1, C1 with $xy$, establishes point A1, and thus also establishes the lines A1, D1, and D1, C1. The balance of the punch test curve is then proportioned in accordance with the size of the orifice approach surface curve A1, C1, Fig. 14, for an orifice of preselected radius C1, $x$.

The size and shape of the orifice curve is thus established and fixed. In many cases, however, the turn to the orifice edge begins at a point on the feed curve which has not yet approached the final minimum flow angle approach alpha to the apex O of the billet. In such cases the angle of feed flow to the orifice curve is greater than the minimum flow angle. Fig. 17 shows at 80, 81, 82, how such varying approach angles become tangent to the orifice curve, as at 83, 84 and 85, and then follow the balance of the orifice curve, lying between the point of tangency and the orifice edge C1.

Figure 18:
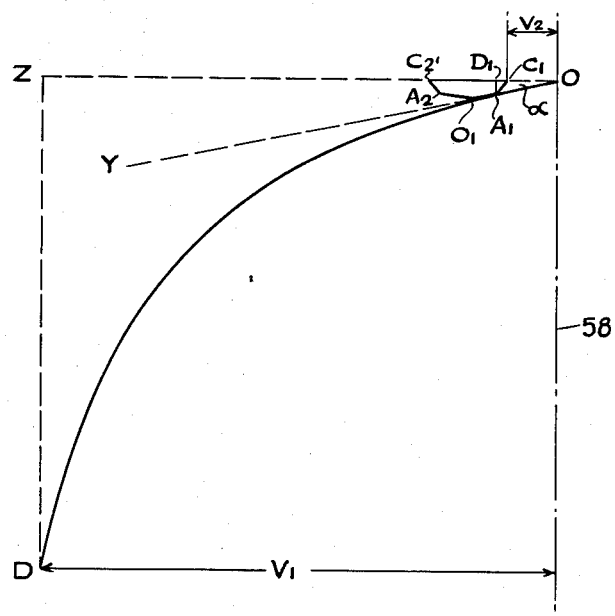
Figures 18 and 19 are graphical analyses, illustrating the derivation from the data of Figures 8 and 14 to 17 inc. of the combined feed curve and orifice sectors of properly contoured direct extrusion dies in accordance with the invention.
Figure 19:
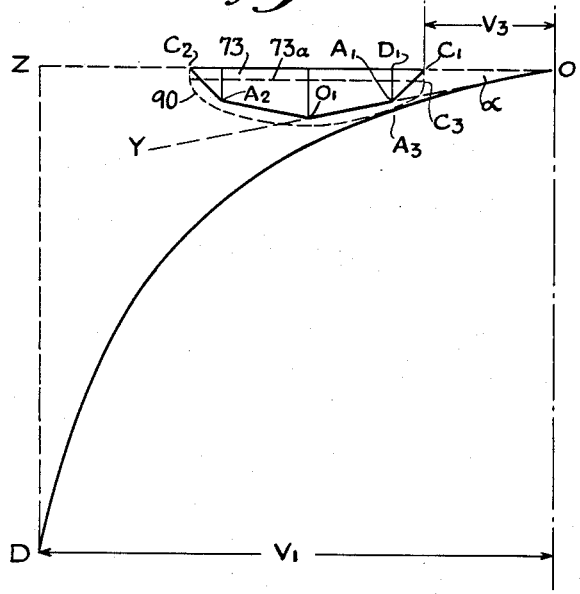

Figs. 18 and 19 illustrate the application of these principles in laying out the complete feed curves for two different extrusion dies having orifices of different radii, but for extruding a billet of the same outside radius. Fig. 18 applies to a die having the smaller orifice radius, in this instance taken as ⅜ of an inch, while in Fig. 19 the die orifice is of one inch radius.

Referring to Fig. 18 the outside radius of the billet is V1, while the orifice radius is V2. The feed sector curve OD, determined as in Fig. 8, intersects the line OZ perpendicular to the billet axis, at the apex O of the billet, at the minimum flow angle alpha.

C1 represents the orifice edge, in this case being ⅜ inch from the billet apex O. From C1 a line C1, A1 is drawn at the angle A1, C1, D1, equal to the fixed angle of the orifice sector, as discussed with reference to Figs. 14–16 inclusive, and intersecting the line OY at A1. A perpendicular is dropped from point A1 to point D1 on line OZ. This establishes the length of the lines A1, D1 and C1, D1, from which the balance of the proportionate punch test curve C1, A1, O1, A2, C2 is laid out in the manner above described. Applying the proportion of the true punch test curve to the orifice sector A1, C1, D1, establishes the orifice curve A1, C1. In this case the point A1 lies upon that portion of the feed curve OD, by which this curve finally approaches the billet apex O along the minimum flow angle alpha. Hence the orifice feed curve A1, C1 is tangent at A1 to the feed curve OD. The complete feed curve for the die is therefore D, A1, C1.

Fig. 19 shows the determination of the complete feed curve for the case where the orifice curve is tangent to the feed curve, at a point on the feed curve which is below that of its final approach to the billet apex O, i. e. below the minimum flow angle alpha. In this case the final complete feed curve is D, A3, C3.

To establish this curve the lines OZ and OY are drawn as in Fig. 18, in conformity with the minimum flow angle alpha. A line C1, A1, is now drawn from the orifice at C1 along the correct orifice sector angle C1, A1, D1, and thus intersecting the line OY at point A1. The punch test curve is then drawn in proportionately as at C1, A1, O1, A2, C2. It will be noted that now, however, the point A1 does not fall upon the feed curve OD, the path of which lies directly below point A1, and, namely, at point A3. As has been shown above, the orifice curve must be tangent to feed curve. Therefore to establish this point of tangency the static zone 73 for the punch test is shifted bodily downward, as shown by the dashed lines 73a, until the true punch test curve 90 becomes tangent, as at A3, to the feed curve OD, so that portion A3, C3, now becomes the orifice curve, the lower edge of the orifice being shifted downwardly to the point C3, the orifice in this case having a radius of V3 equal to one inch. Therefore the complete die feed curve becomes D, A3, C3.

To complete the die design the length of the die throat must be determined. The die throat is that portion of the die lying beyond the end of the orifice curve, and which conforms to the exact shape and size of the orifice itself.

Usually it is assumed that the extrusion operation is completed when the material passes through the orifice and that the die throat functions primarily from a structural standpoint. This is a false assumption, for the use of a correctly sized die throat is a vital factor in the production of sound, smooth surface, commercially acceptable extruded parts.

As shown above, when the material being extruded flows along the feed curve it is moving towards the apex of the billet, following a progressively constricted pathway. When the beginning of the orifice curve is reached, this pathway reverses itself, the restrictive pressure is removed, and the actual movement and turning towards the orifice begins. Thus the orifice sector, previously described, is established.

Figure 20:
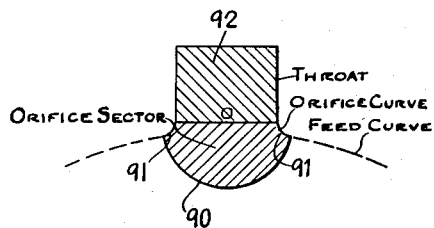
Figures 20 and 21 are graphical analyses illustrating the derivation of the extrusion "throat" portion of the properly contoured extrusion dies of the invention.
Figure 21:
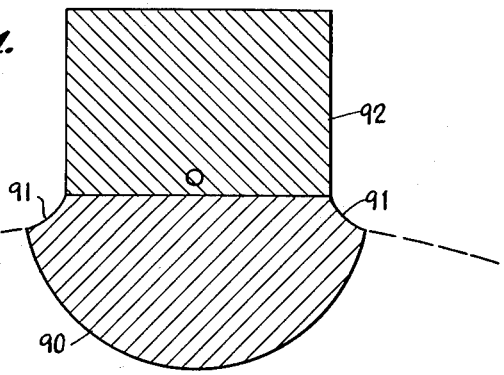

It is only the material adjacent this orifice sector which is actually being forced to and through the orifice opening, the balance is being directed towards the apex O of the billet. The movement through the orifice of an extrusion operation, therefore, consists of a continuous forcing of a multiplicity of volumes of the material through the smaller opening of the orifice itself. This is illustrated in Figs. 20 and 21 of the drawings.

This necessary contraction of the billet material naturally causes the development of expansion forces the instant the material leaves the orifice, these forces manifesting themselves in the form of tensile stresses. When the tensile strength at elevated temperature of the material being extruded is not great enough to resist these stresses, surface checking and cracking ensues. The greater the speed of the extrusion operation the more destructive this action becomes.

Since no tensile stresses can function if the extruded material is being held in compression, it is necessary to subject the extruded section to compression until the entire volume of material between and immediately ahead of the orifice wall has been passed through the orifice, and the internal forces have become stabilized.

This is accomplished by having the extruded section held in continuous, compressive contact with the die throat for such a distance as to make the volume of the throat at least equal to the volume of extruded material between and immediately ahead of the orifice wall which will be called hereinafter the "orifice volume".

The correct throat size of the die is of no avail for the prevention of checking unless the extruded part is in continuous direct contact with the walls of the throat, and this is accomplished only when the correct feed and orifice curves are used.

Referring to Figs. 20 and 21 the orifice volume is shown at 90, and comprises a substantially spherical sector of the extruded material defined by the boundaries of the orifice curve 91 and the center of which spherical sector is at the apex O of the billet. As stated the die throat 92 must have a volume at least equal to that of the orifice volume 90. Fig. 20 illustrates the throat of the smaller orifice die of Fig. 18, while Fig. 21 illustrates the same for the larger orifice die of Fig. 19.

Figure 24:
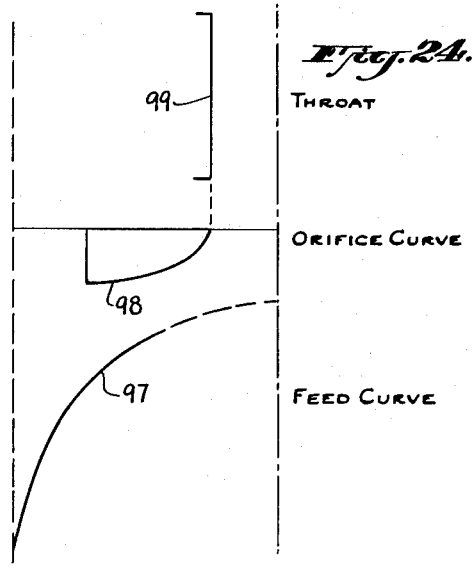
Figure 25:
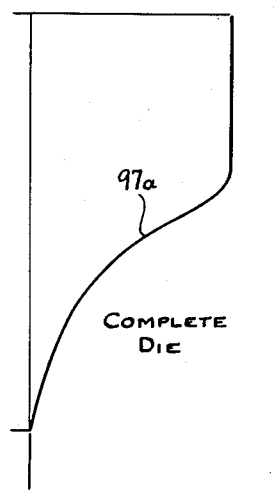
Figure 22:
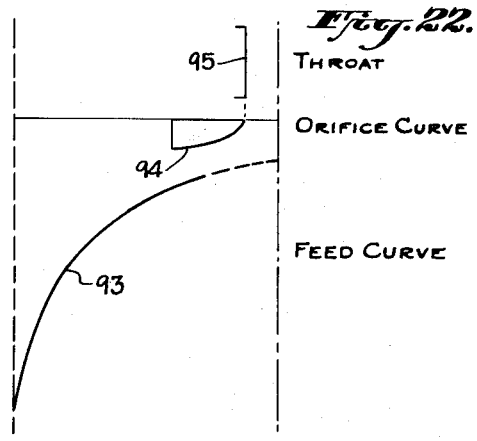
Figure 23:
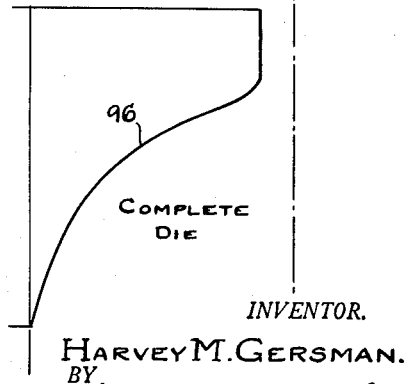

To complete the die, it is required only to combine the three components comprising the feed curve, the orifice curve and the die throat in the manner illustrated in Figs. 22 and 23, for the smaller orifice die curve of Fig. 18, and in the manner illustrated in Figs. 24 and 25 for the larger orifice die curve of Fig. 19.

Fig. 22 shows at 93, 94 and 95, the previously designed feed curve, orifice curve and throat length, for a four inch diameter die having a ⅜ inch radius orifice. Fig. 23 shows at 96 the complete die curve resulting from combining these components in the manner above described. Fig. 24 shows at 97, 98 and 99, the corresponding die curve components for a four inch diameter die curve having a one inch radius die orifice, while Fig. 25 shows at 97a the complete die curve obtained by combining these components.

The die curves 96 and 97a outline the theoretically correct contour of the flow zone of the die from its inception at the sidewalls of the die to the exit from the orifice. By employing these theoretically correct contours, no shearing of the billet or distortion or turbulence of metal flow, or any extrusion pipe, scouring, gouging or abrasion of the die can develop, during the extrusion operation. This is conclusively established by Fig. 26 which shows a drawing taken from an actual photograph of a billet partially extruded through a correctly contoured die in accordance with the above teachings. This billet was made of the same aluminum alloy as that of Fig. 4, in that a comparison of the results for Figures 4 and 26 furnishes striking experimental confirmation, of the remarkable improvement resulting from the present invention. In Fig. 26 the feed curve of the die is shown at 98, and it will be noted that the flow paths 99 of the material during extrusion coalesces wholly free from turbulence into the extruded bar 100, to produce a product free from extrusion pipe and of uniform and homogeneous structure throughout.

Indirect extrusion

The difference between direct and indirect or inverted extrusion resides in a change in the method of applying to the billet the forces causing internal flow.

In direct extrusion the ram enters one end of the cylindrical extrusion chamber, and pushes the billet to and through the die opening in the opposite end of the chamber. Thus in addition to the internal flow of billet metal, the billet as a whole is moved through the extrusion chamber in direct frictional contact with its walls.

In indirect extrusion one end of the cylindrical container is completely closed and the opposite end completely open. A hollow ram to which a die is attached, enters the opposite open end and presses the billet against the wholly closed end. The resulting squeezing action causes the material of the billet to flow to and through the die opening in the hollow ram, the only place of egress. There is no displacement movement between the side of the billet and the walls of the container.

The same factors which govern internal flow, and, hence, govern extrusion flow, exist and function in both methods, but because of the difference in the methods for inducing such internal flow, the resulting extrusion flow patterns differ in many respects.

While the direction of movement of each point within the billet is wholly different in the two methods, the major changes are in the contour of the flow zone and the size of the orifice curve. Since these are the two factors which determine the die design, a considerable difference exists between the contour of direct and indirect extrusion dies. Neither type can be successfully used in the other method. Each die must be designed to fit the extrusion method used, even though the analysis of the billet is the same.

When an indirect die engages the billet and attempts to force its way into it by virtue of material displacement, a static zone adjacent to the face of the die is immediately formed. This zone in most respects resembles that established in the previously described punch tests.

Thus, referring to Fig. 27, the indirect extrusion apparatus comprises a cup-like extrusion chamber 110 completely closed at one end 111 and completely open at the opposite end 112. The extrusion ram 113 fits into and slidably engages the open end 112, this ram having an axial bore 114, which forms the extrusion orifice.

As the ram 113 is forced into the chamber 110 against a billet 115 positioned in the latter, a static zone 116 similar to that of the punch test, is formed beneath the lower face 117 of the ram. There is no natural or normal flow of the metal within the static zone 116, but just as in the punch test, there is a flow of displaced material around these static zones and into the die orifice as indicated by the flow lines 118.

Thus, while the first flow of the billet metal through the orifice 114 comes from the orifice sector AOC, just as in the direct method, the outer limits of this sector, are in the indirect extrusion, outlined by the boundary 119 of the static zone 116. Thus, from the very inception of indirect extrusion, this static zone establishes an orifice curve, as at 120, correct for these conditions, leading to the orifice edge 121 of the extrusion ram itself.

Referring to Fig. 28, when the die first engages the billet 115, the static zone 116 is established adjacent to the die face 117, and extending from the inner container wall 122 to the orifice edge 121. The normal functioning of such a zone would cause the displaced billet material to flow, from its vertical center line 123, in both directions to and around the edges of the zone. The billet material which would normally flow in the direction of the container wall is cause to compact in the triangular static zone 124, and continues to do so until compression causes rupture, beginning at the container wall and extending in the direction of the only possible direction point of movement, i. e., the flow to and through the orifice, along the shear path 125. Actually, this rupture zone joins the boundary of the static zone 124 at the beginning of its orifice curve sector, namely, at 126. From that point on all of the material in the static zone 124 of the billet is cut off from the balance of the billet and proper flow is confined to the area contained between rupture boundary 125. This boundary thus forms the outer limit of the feed sector, and the material lying within it moves forward approximately along the flow paths 126, to join the material within the orifice sector in properly proportioned positions. Thus, this portion of the flow zone for indirect extrusion is established.

Just as in direct extrusion, the flow along rupture boundary 125, causes a shearing action within the billet itself, isolating the flow zone 126 from the balance or static portions 124 of the billet. The harder and the cooler the billet material, the more this shear-like action approaches actual separation. The action of the static mass is the same in indirect extrusion, as is the static mass 25, Fig. 3, of direct extrusion and hence requires no further discussion.

In indirect extrusion, the initial movement of the outer edges of the billet is away from the die. Fig. 29 illustrates this. Let line 140 represent a bevelled die. Let point 141 represent the point in the billet directly below the outer edge of the die. When the die moves to the position 142, it pushes point 141 to point 143. The path of movement from 141 to 143 in relation to the billet itself is angularly downward towards its base and away from the original die position. Yet in relation to the die face it has moved upwards and inwards towards the orifice. This action is repeated until the point in question reaches and passes through the orifice. Thus when the die has moved to position 144, point 141 will have moved to position 145, and so on.

Fig. 30 illustrates various actual individual flow paths employing a properly contoured feed curve 146 in accordance with the invention. These paths A—A', B—B', C—C', etc., represent various stages during a complete extrusion operation. Note how the original downward flow of certain points is modified by the orifice flow. This united movement away from the die eliminates all possibility of a fin forming between the container wall and the die provided that not more than slidable clearance (two thousandths of an inch) is allowed. When a flat faced or incorrectly contoured die is used, the nature of the flow necessarily causes such a fin to develop with deleterious results.

In order to provide scientifically correct mechanical conditions for indirect extrusion, the die contour must coincide with the contour of the flow zone, just as was shown to be necessary for the case of direct extrusion. In order to do this, it is again required mathematically to develop this contour for any given material. This development is generally the same and employs the same formulas derived above for direct extrusion. That is to say, the curve for the feed sector in indirect extrusion is the same as that derived in connection with Fig. 8 above, for direct extrusion, with the single exception that the angle at which this curve approaches the side wall of the die is different in indirect extrusion from that for direct extrusion. On the other hand the angle at which this curve approaches the apex of the billet is, in each case, the angle of minimum internal flow of the metal to be extruded. For indirect extrusion, however, the angle at which this curve approaches the side wall of the die is the angle of rupture of the extruded material.

Once these two terminal angles are determined the slope of the feed curve for indirect extrusion at any intervening point there of, may be computed from Equations 1 to 3 above, for the case where the billet is theoretically divided into a finite number of equal volumes, or is computed from Equations 10 to 13, above, where this curve is to be derived as a continuous function of the $x$, $y$ coordinate system.

Thus, referring to Fig. 31, the feed curve 130 for indirect extrusion is, as stated, derived in the same manner as the feed curve 60, Fig. 8, for direct extrusion, all symbols having the same significance in the two figures with the exception of the angle at which this curve approaches the side wall of the extrusion chamber. In the direct extrusion of Fig. 8, this angle, phi, is, as above explained, the minimum flow angle of the material, whereas in the indirect extrusion of Fig. 29, this angle sigma is the angle of rupture of the material.

This angle of rupture equals 45° plus ½ the angle of repose of the material. The angle of repose is normally understood to be the angle with the horizontal at which powdered or granular material will stand when loosely piled. But that situation is also comparable to that existing in a body of plastic material under pressure. The latter too will slide until a certain angle is reached, at which point the remainder will "stand piled." This was illustrated above in connection with the punch test, which shows that the angle at which a plastic body will stand piled under pressure is the angle of minimum flow. Accordingly we can substitute the angle of minimum flow for a plastic material, for the angle of repose of a powered or granular material, and thus calculate for the plastic material the angle of rupture thereof as comprising 45° plus ½ the angle of minimum internal flow of the material. Hundreds of tests which I have made have proven this to be correct.

Fig. 31 shows at 130 the resulting contour of the feed sector of an indirect die computed on this basis as compared to a corresponding curve shown at 131, the latter computed for direct extrusion. For the indirect extrusion curve 130, the apex of the billet is shown at $O_1$ while for the direct extrusion curve 131 the apex of the billet is shown at $O_2$. In each case the curve approaches the apex of the billet at the angle alpha, namely, the angle of minimum internal flow of the billet material. But whereas for direct extrusion the feed curve 131 approaches the side wall 132 of the extrusion chamber also at the minimum flow angle alpha, the curve 130 for indirect extrusion approaches the side wall at the angle sigma comprising the angle of rupture of the billet material, i. e. 45° plus ½ the minimum flow angle thereof.

To complete the die design, it is necessary to combine the three components previously developed. This is illustrated in Fig. 32 which shows the individually designed feed curve 146, orifice curve 147 and throat length 148 for an indirect die, four inches in diameter with a one inch diameter orifice. Fig. 33 shows these three parts combined into the completed die design curve 149. Note that the feed curve 146 and the orifice curve 147 are tangent, and that the orifice curve joins the throat 148 at an angle. The outside diameter of an indirect die is usually about four thousandths of an inch less than the inner diameter of the container, thus allowing a slidable fit.

Fig. 34 is a drawing from an actual photograph of a clay billet partially extruded by a flat faced indirect extrusion die. The billet prior to extrusion was like that shown in Fig. 5 consisting of a cylindrical core 40 of dark clay, encased in an outer layer 41 of white clay of uniform thickness. It will be noted how the white and black clay layers have been deformed along the shear line 125 of Fig. 28, thus establishing that the natural flow curve 125 for the indirect extrusion die is of distinctively different configuration from that of the direct extrusion die, the latter as also experimentally established by the test results of Fig. 6 made on a similar type of billet. Fig. 34 also shows at 155, the relatively static corner zone mass which is slowly extruded as an outer layer or pipe 156 about the inner core material 157, the latter supplied from within the flow zone of the billet.

Fig. 35 is a drawing from an actual photograph of one-half of a metal billet prepared and partially extruded in the same manner as in Fig. 26 above described, but employing in this case an indirect die, correctly contoured, as in Figs. 32 and 33. It will be noted that there is no turbulence in the flow paths 157 of the initially parallel lines 158 marked on the sectioned face of the billet half. Figs. 26 and 35 furnish additional experimental comparison as to the difference in correct contouring of direct and indirect dies.

Sidewall extrusion

When a plastic body with the general dimensions of an extrusion billet is subjected to compression, and its length consequently shortened, the first compensating movement or flow occurs in a lateral direction at its center. Thus, in Fig. 36, EFHG is a plastic body or billet subjected to compression between platens AB and CD. As AB moves to A' B' or CD to C' D', or both, the length of the billet is reduced from EG to E' G'. To compensate, lateral flow occurs along its center line first, and points X and Y are moved outward to points X' and Y'. If this action is continued to the stage shown in Fig. 37, the shape of billet EFHG is changed to that illustrated, with points X and Y extended laterally to form the outermost edges, thus indicating that the lateral flow at the center line remains dominant.

Referring to Figs. 38 and 39, this same type of spreading action takes place when a billet 170 is "blocked-out" within an extrusion container 171. To enter the container quickly and easily the billet naturally must be of smaller diameter. When the ram 172 is forced against it, the first action causes the billet to "block-out," or to spread until the container is completely filled. No extrusion takes place until such spreading action is completed.

In Fig. 38 when the ram moves forward, compressing the billet between AB and CD, the resultant action is similar to that shown in Fig. 36. Points X and Y at the centerline of the billet move laterally to contact with the walls of the container at X' and Y'. This spreading action (all lateral flow) continues as the ram advances, until the final stage is reached, as shown in Fig. 39. The last portions of the billet to fill out to the container walls are the corners 174.

When extrusion finally is initiated, the force or pressure required is immediately greatly increased, combining necessarily the force for lateral flow, the force for subsequent flow towards the orifice 173 (a 90° turn) plus the force required for the reduction of area to permit egress through the orifice.

The sidewall extrusion of the invention, is designed to take advantage of the natural, dominant flow trend of a plastic billet under compression, i. e. lateral flow at the center line. Referring to Figs. 40 to 42 inc., an open ended container 174a is provided with opposing orifices 175, 176, cut into the container at its horizontal center line. A billet 177 is inserted. Rams 178, 179, enter the opposite ends of the container, and compress the billet between them. The resulting dominant flow is laterally at the center line—directly to and through the orifices, as at 180, 181, Fig. 42. This action is continued until the rams reach the edges of the orifices, as in Fig. 42. Throughout, the natural flow has been in the direction of the orifices, with the only added force being that required for the concentration of all such lateral flow to and through the orifices.

In conventional extrusion, the length of the billet is based upon a fixed relationship to its diameter for various mechanical reasons, including heat retention and the length limiting "column effect" upon the ram. Since each ram in sidewall extrusion moves only half the length of the billet, each such half-billet length can be made equal to the full billet length of a conventional extrusion apparatus, without further stressing of either ram. Thus a double length billet can be used. The rams move simultaneously. Therefore, in the sidewall method, a double length billet is extruded in the same time cycle as required for a single length in the direct method, thus automatically doubling the production.

The residual butt 182 remaining in the container at the conclusion of a sidewall extrusion is usually a disk of the billet diameter and the depth of the extruded part. This in every case is substantially smaller than the residual butt remaining after extrusion in a conventional apparatus, wherein the size of said butt is governed by the contour of the flow zone and not by the size of the extruded part. Add to this the fact that the smaller butt in sidewall extrusion is applied to a double length billet, and the greatly higher percent of recovery is clearly evident. Stating this conversely, the percentage of scrap in sidewall extrusion is very substantially less than for other methods, in some cases being not more than one and one-half percent.

Both direct and indirect extrusion are concerned only with internal flow in the vertical or axial directions of the extrusion chamber. The contour of their flow zone, if revolved about the center line of the extrusion chamber, establishes the flow zone for the entire billet.

In sidewall extrusion, internal flow occurs in both the vertical and horizontal directions, i. e., axially of the extrusion chamber and also transversely thereof. The material of the billet, impelled by the rams, moves as a mass in the vertical direction toward the horizontal axis of the orifices. Some of the material at the edges of the billet flows directly from the vertical direction to and through the horizontally disposed orifices; the balance turns to join the lateral flow in the horizontal direction. Whether it be from the vertical or horizontal directions, all flow into the orifice is again subject to that governing factor of internal flow, the angle of minimum flow.

Fig. 43 shows at 190, flow along the vertical path. The initial application of vertical pressure translated to horizontal flow, causes the sides of the billet 191 to be sheared against the edges x, y of the orifice 192, thus forcing a certain amount to pass through the orifice. Replacement flow begins at once, and is directed towards the point of greatest movement, the center point O of the orifice, corresponding to the billet apex in direct or indirect extrusion. Such replacement flow cannot move along lesser angles with respect to the container wall 193, than the angle of minimum flow. Therefore the lines AO and BO are instantly established, since angles AOA' and BOB' constitute such angles of minimum flow. The continued movement to and through the entire orifice causes the material flowing along paths AO and BO to turn at points X' and Y', Fig. 44, to join this movement, thus establishing the inner or actual orifice at these points.

The material confined between the container wall 193 and the lines AO and BO, does not flow and constitutes a static zone, 194, subject only to mass movement. This effect is similar to that existing in both direct and indirect extrusion, in which two methods the corresponding lines AO and BO eventually become connected with the outer boundary of the feed zone, to form the contour of the flow zone. This does not occur in sidewall extrusion, for the movement to the orifice sector in the vertical direction is a mass movement. As a result, the material along the walls of the container shears off around the static zone 194, and in doing so builds up an extension 195 of that zone having the general contour of the continuation of the parabolic orifice curve. The balance of the billet moves en masse to the various points where curvature to join a proportionate position in the lateral flow takes place.

Fig. 45 shows a horizontal cross-section through the orifice plane. Again the flow to and through the orifice is governed by the angle of minimum flow, and the usual static zones 196, 197, are established, which, just as in the vertical flow, extends to contact with the container walls. It is in this horizontal direction that the major flow to the orifice takes place. The flow pattern is, however, quite different from any developed in ordinary extrusion, wherein the pattern is formed as a result of force applied to the billet by a moving ram or die.

In sidewall extrusion the flow is the result of a lateral "bulging" of the billet. Confined on all sides except for the orifice openings, the billet is squeezed in the vertical direction between two rams. The opposed portions of the billet meet at the center line and bulge outward towards the only escape—the orifices. Such action takes place over the entire cross-section, and each point thereon is drawn towards the orifice. As a result, there is no feed flow in the strict sense, it is all orifice flow. The entire flow pattern consists of a family of curves 198 based upon the correct orifice curve. Consequently there is no feed zone as described for direct or indirect extrusion. The entire cross-section of the billet, through the plane of the orifice axis constitutes the flow zone, one half flowing to one orifice 192, and the other half to the opposite orifice 192a.

Sidewall extrusion can be practiced with as many orifices in the center plane as structural strength of the container will permit, or good production practice would dictate. The internal flow pattern would be similar to that shown in Fig. 45 for each such orifice, the only variation being that the flow in the horizontal direction would be divided into an equivalent number of sectors, instead of the halves illustrated in that figure.

The movement in the vertical direction is a mass movement of each end 191, 191a of the billet towards the horizontal plane of the orifice axis. When opposed orifices are used the material turns as shown at 199, 199a, Fig. 48, from this mass movement to assume its proportionate position in the lateral flow, with the radius of such curvature being the smallest at the center line where the squeezing action is most direct, as at 200.

When a single orifice is used as in Figs. 46 and 47, the radius of the curvature 201, from vertical to horizontal flow, increases as the distance from the orifice increases, and reaches its maximum in the curvature 202 from the opposite wall of the container 203. This curve extends from the container wall to the center D of the billet along the paths CD and ED. The flow along these paths provides a shearing action similar to that along the boundaries of the flow zone in direct and indirect extrusion, and isolates that portion 204 of the billet lying between the container wall and lines CDE. The building up of this isolated mass in the vertical direction also causes a similar action in the horizontal direction, as at 204 of Fig. 47, and also within the confines of the shear line EDC as in Fig. 46. Thus with a single orifice, two isolated static masses are established, i. e., one, 205, adjacent to the orifice and that at 204 opposite the orifice.

The same extrusion defects and difficulties which arise whenever the die design permits internal shearing and the isolation of various billet portions, also occurs in the sidewall method as above described with reference to Figs. 43-47 inc. If these conditions were allowed to exist, the same die troubles and imperfect extrusions would result, just as in both the direct and indirect methods. The material blocked off at the orifice will compact and build up in both the vertical and horizontal directions, and thus eventually move along the die edge and into the orifice as a mass, to cause excessive wear on the die and to form the highly objectionable extrusion pipe. With a single orifice, the static mass 204, at the opposite wall will gradually force its way into the center of the extruded article, thus forming in addition an ever increasing loose core of improperly worked material.

In order to eliminate the above noted defects, the orifice curve is developed in the same manner previously described with reference to direct and indirect extrusion, and is based upon a punch test of the material to be extruded. In side wall extrusion the orifice curve is made tangent to the container side wall at all portions thereof which approach the orifice at an angle greater than the minimum flow angle, while in the portions of the container side wall which would approach the orifice curve at less than the minimum flow angle, the side wall has the minimum flow angle imparted thereto, and the orifice curve is made tangent in these portions. The region of the side wall so contoured is that including and adjacent to the vertical axial section through the extrusion chamber and the orifice axis. While the entire horizontal flow pattern consists of continuations of the orifice curve, the usual orifice sector exists since that is the region of greater reduction of area. Therefore, the throat length is also calculated in the previously described manner. Fig. 48 illustrates the application of such an orifice curve and throat for the vertical axial plane, and Fig. 49 shows the horizontal axial plane of the orifice. For all ordinary work, the entire die 203 for sidewall extrusion consists only of this orifice curve and throat, as illustrated at 206 and 207, respectively. However, in the vertical sector of Fig. 48, the sidewall 193 of the extrusion chamber approaches the orifice sector along the minimum flow angle, as at 208a and for reasons above explained.

When the portion of a billet flows from the far wall of a container toward a single orifice directly opposite, its pathway is dictated by the usual factors governing internal flow. It moves away from the sidewall in the vertical axial plane of Fig. 46 along the angle of minimum flow, and it joins the lateral flow at the billet center line along the same angle—the least angle along which internal flow is possible. Hence referring to Fig. 46, the angles alpha and phi are equal to the minimum flow angle of the extruded material, and the curves ED and CD of Fig. 46, coincide exactly to the feed sector curve of a direct extrusion feed curve, based upon the correct minimum flow angle ascertained from a punch test. The method of calculation follows that described for such a direct feed curve. Still referring to Fig. 46, EDC is a surface of revolution about the orifice axis. Hence in the horizontal plane of Fig. 47 curve EDC has the same slope as in Fig. 46, from the center D to the sidewall of the extrusion chamber 203. These curves if continued would intersect a plane 204a, tangent to the inner wall 204b at the point 204c, at the minimum flow angle, alpha, as shown.

To render single orifice sidewall extrusion effective, a plug or insert of cone-like character having the contour of such a feed curve, must be injected into the billet after it has been properly positioned in the container. This plug replaces the mass 204, Figs. 46 and 47, which would otherwise be isolated from the balance of the billet, and thus, in conjunction with the correct orifice curve, permits proper, proportionate flow of the entire billet to and through the orifice, resulting in sound, homogeneous extruded articles. Such an insert is shown at 209, Fig. 50.

Referring to Fig. 51, a fixed orifice 210 of a predetermined size and having the correct curvature, can be used for all shapes and sizes. The final sizing or shaping can then be accomplished by the use of a small direct extrusion die, 211, threadedly engaging an aperture of the container wall, and having at its inner edge the fixed orifice curvature 210. With this arrangement, the die changes are all effected outside the container itself, and greater flexibility is possible; highly desirable compound extrusion is secured; yet the tools required are materially smaller than in any other method, and the percent of recovery remains high. The size of the direct die used is based upon the diameter of the primary orifice 210, and not upon the size of the billet. The rams can be brought to meet at the axis of the orifice without affecting the final flow through the primary or secondary orifices, 210 and 213. Thus the residual butt is composed of a thin compressed disk between the rams, plus the material remaining in the small direct die.

To extrude tubing, it is necessary to pierce the billet with a mandrel, which then projects through the orifice. In conventional apparatus, such as that of Fig. 52, the piercing is effected longitudinally of the billet 220, by means of a long, cylindrical mandrel 221. The extruding material flows into the space 223 between the orifice edge 224 and the mandrel, thus forming a seamless tubular product. This piercing, for production reasons, is actually a punching action. To secure uniform thickness of the tube walls, the projecting mandrel must be exactly centered in the orifice, and must therefore be sufficiently strong and stiff so that it will not "wander," or get out of alignment when being forced to punch through the entire length of the billet. It must be strong enough to withstand any uneven flow pressure during extrusion resulting from uneven heating of the billet, and still maintain its position in the exact center of the orifice. It must have sufficient body to be able to absorb the heat from the billet in which it is embedded without distortion or softening, or without necking in as a result of seizure by the moving metal. As a result, certain very definite limitations are imposed upon conventional tube extrusion apparatus, which become increasingly restrictive with the higher temperature metals such as steel.

Commercial concentricity is most difficult to attain. Consequently, most seamless tubing heretofore produced, must be hot or cold drawn for sizing purposes. The minimum inside diameter is limited because of definite minimum requirements for mandrel thickness to provide the necessary length and strength for piercing and to give sufficient heat-absorbing body. The length of the extruded tube is limited because the billet size must be accommodated to the proper proportion of length and thickness of the mandrel. The principal difficulties of the conventional apparatus, arises from the center, longitudinal piercing, as shown in Fig. 52, which exposes any billet segregations and causes them to form the inner surfaces of the tube walls.

Fig. 53 shows an application of the sidewall extrusion apparatus of the present invention to the production of seamless tubing. When extruding tubing by the sidewall method, a single orifice 225 is used. The mandrel 226 pierces the billet 227 from the side of the extrusion chamber 228, opposite this orifice. Thus, the required length of the mandrel is limited to the diameter of the billet, and not upon its length. This in itself greatly increases the range of sizes possible and the accuracy of mandrel centering. However, mandrel strength, its life and all of the concomitant advantages, is further increased in accordance with the aspect of the invention, by contouring in accordance with the flow path characteristics of the material to be extruded.

As pointed out with reference to Figs. 46 and 47 above, when a single orifice is used, the flow from the opposite side of the billet follows the feed curve of a direct extrusion die along the shear line or surface EDC. Since such flow causes shearing through the billet, and the isolation of the sheared portion, as at 204, Figs. 46 and 47, this is avoided by the substitution of a properly contoured insert for the static mass, at 209, Fig. 49. That insert can be made an integral part of the mandrel, as at 230, Fig. 53.

To design a sidewall tube mandrel, such as 226 of Fig. 53, the required data is the inside diameter of the tube to be extruded, and the angle of minimum flow for the material to be extruded. From this data the feed sector curve 230 is computed in this manner above described with reference to Fig. 8 and extends as a surface of revolution, from the opposite sidewall 228, substantially to the orifice sector 205 at the orifice die 203, each of the angles phi and alpha being made substantially equal to the minimum flow angle of the extruded material.

After the billet has been properly positioned in the container, this cantilevered mandrel 226 pierces it horizontally, by a metal spreading, rather than a punching action. The extrusion operation is inaugurated and the flow pattern follows that outlined at EDC, Figs. 46 and 47, for flow in single orifice sidewall extrusion.

The overall length of the mandrel is based upon the diameter of the container, and not upon the length of the billet as in conventional methods. The length of that portion 231 of the mandrel which is equal to the inner size and shape of the tube extends only through the throat 205 of the die, rather than the full length of the billet.

With such a mandrel piercing horizontally, concentricity can always be secured, and the subsequent drawing operations for sizing can be eliminated. Because of the shortness of the mandrel and its progressively increasing sectional dimensions and strength, much smaller inner tube openings become commercially feasible, thus greatly increasing the range of sizes extrudable. Also due to the size and shape of the mandrel, increased heat absorption without damage is secured. And since the shape of the mandrel conforms to the flow pattern of the metal being extruded, seizing, scouring and abrasion is either completely eliminated, or so minimized as to greatly increase mandrel life. By reason of the mode of operation of sidewall extrusion, plus the size and shape of the mandrel, double length billets can be used, thus increasing the length of the extruded tube and doubling production. And since the outer surface of the tube is formed by the side of the billet adjacent to the orifice, and the inner surface by the opposite side of the billet, segregations remain in the center of the tube wall, instead of appearing on the surfaces.

Reference is made to my copending application Serial No. 500,679, filed August 31, 1943, entitled "Extrusion" and now abandoned, to my prior applications Serial No. 387,535, filed April 8, 1941 and entitled "Apparatus for Extrusion," and Serial No. 423,341, filed December 17, 1941 and entitled "Method and Apparatus for Extrusion," both of which have been abandoned, and to my prior application Serial No. 297,920, filed October 4, 1939, entitled "Apparatus for Extrusion" and now Patent No. 2,335,590, which applications are directed to similar or related subject matter.

What I claim is:

1. A tubular extrusion member having a movable end wall with an orifice therein and having a concave feed surface which converges toward said orifice, said surface comprising, in axial section, a continuous curve constituted of an arithmetric progression of terms representing equal concentric volumes to be displaced during extrusion, said curve corresponding substantially to the formula $$\text{delta} = \text{alpha} + (n-1)\text{ beta}$$

wherein $n$ is the number of such equal volumes disposed between the axis of said member and any point on said curve, delta is the angular slope of said curve at any point thereof with respect to a perpendicular to said axis, beta is the constant angular increment by which said slope is changed in passing from one said volume to the next, and alpha the angle between said curve and a perpendicular to said axis at the point of intersection of said curve with said axis, and wherein alpha has a magnitude substantially equal to the minimum angle of internal flow of a plastic material to be extruded, said curve intersecting the side walls of said tubular member at substantially the angle of rupture of said material to be extruded.

2. A tubular extrusion member having a movable end wall with an orifice therein and having a concave feed surface which converges toward said orifice, said surface comprising, in axial section, a continuous curve constituted of an arithmetric progression of terms representing equal concentric volumes to be displaced during extrusion, said curve corresponding substantially to the formula $$\text{delta} = \text{alpha} + (n-1)\text{ beta}$$

wherein $n$ is the number of such equal volumes disposed between the axis of said member and any point on said curve, delta is the angular slope of said curve at any point thereof with respect to a perpendicular to said axis, beta is the constant angular increment by which said slope is changed in passing from one said volume to the next, and alpha the angle between said curve and a perpendicular to said axis at the point of intersection of said curve with said axis, and wherein alpha has a magnitude substantially equal to the minimum angle of internal flow of a plastic material to be extruded, said curve intersecting the sidewalls of said tubular member at an angle substantially equal to 45° plus one-half said minimum angle of internal flow of said metal to be extruded.

3. A tubular extrusion member having sidewalls and a movable end wall with an orifice therein and having a concave feed surface which converges therefrom toward said orifice, said feed surface terminating adjacent said orifice in a convexly curved orifice portion tangential thereto and extending thence to said orifice, said surface comprising, in axial section, a continuous curve constituted of an arithmetric progression of terms representing equal concentric volumes to be displaced during extrusion, said curve corresponding substantially to the formula $$\text{delta} = \text{alpha} + (n-1)\text{ beta}$$

wherein $n$ is the number of such equal volumes disposed between the axis of said member and any point on said curve, delta is the angular slope of said curve at any point thereof with respect to a perpendicular to said axis, beta is the constant angular increment by which said slope is changed in passing from one said volume to the next, and alpha the angle between said curve and a perpendicular to said axis at the point of intersection of said curve with said axis, wherein alpha has a value substantially equal to the minimum angle of internal flow of a plastic material to be extruded, said feed curve intersecting said sidewall at substantially the angle of rupture of said material, and said orifice portion having in axial section a substantially parabolic curvature extending tangentially to said orifice.

4. A tubular extrusion member having sidewalls and a movable end wall with an orifice therein and having a concave feed surface which converges therefrom toward said orifice, said feed surface terminating adjacent said orifice in a convexly curved orifice portion tangential thereto and extending thence to said orifice, said feed surface comprising, in axial section, a continuous curve constituted of an arithmetric progression of terms representing equal concentric volumes to be displaced during extrusion, said curve corresponding substantially to the formula $$\text{delta} = \text{alpha} + (n-1)\text{ beta}$$

wherein $n$ is the number of such equal volumes disposed between the axis of said member and any point on said curve, delta is the angular slope of said curve at any point thereof with respect to a perpendicular to said axis, beta is the constant angular increment by which said slope is changed in passing from one said volume to the next, and alpha the angle between said curve and a perpendicular to said axis at the point of intersection of said curve with said axis, wherein alpha is substantially equal to the minimum flow angle of a plastic material to be extruded, said feed curve intersecting said sidewalls at an angle of substantially 45° plus ½ said minimum flow angle, and said orifice portion having in axial section a curvature conforming substantially the terminal sector of the static zone formed by impressing a punch into said material.

5. A tubular extrusion member having sidewalls and a movable end wall with an orifice therein and having a concave feed surface which converges therefrom toward said orifice, said feed surface terminating adjacent said orifice in a convexly curved orifice portion tangential thereto and extending thence to said orifice, said feed surface having the shape, in axial section, of a portion of a continuous curve conforming substantially to the formula $$dy/dx = \tan\left(\text{alpha} + \frac{2}{3}(90° - \text{phi} - \text{alpha})X^2\right)$$

wherein the $y$ axis is the axis of said die, and the $x$ axis intersects the same at a point where a projected continuation of said feed curve intersects said $y$ axis, phi is the angle at which said feed curve diverges from said sidewalls, alpha the angle between said feed curve continuation and said $x$ axis, and X the ratio of any abscissa to said curve and the radial distance to said sidewall at said axial section, wherein alpha is substantially equal to the minimum flow angle of a plastic material to be extruded and phi the angle of rupture thereof.

6. A tubular extrusion member having sidewalls and a movable end wall with an orifice therein and having a concave feed surface which converges therefrom toward said orifice, said surface having the shape, in axial section, of a portion of a continuous curve conforming substantially to the formula $$dy/dx = \tan\left(\text{alpha} + \frac{2}{3}(90° - \text{phi} - \text{alpha})X^2\right)$$

wherein the $y$ axis is the axis of said die, and the $x$ axis intersects the same at a point where a projected continuation of said feed curve intersects said $y$ axis, phi is the angle at which said feed curve diverges from said sidewalls, alpha the angle between said feed curve continuation and said $x$ axis, and X the ratio of any abscissa to said curve and the radial distance to said sidewall at said axial section, wherein alpha is substantially equal to the minimum flow angle of a plastic material to be extruded, and phi is substantially equal to the angle of rupture thereof.

7. A tubular extrusion member having sidewalls and a movable end wall with an orifice therein and having a concave feed surface which converges therefrom toward said orifice, said surface having the shape, in axial section, of a portion of a continuous curve conforming substantially to the formula $$dy/dx = \tan\left(\text{alpha} + \frac{2}{3}(90° - \text{phi} - \text{alpha})X^2\right)$$

wherein the $y$ axis is the axis of said die, and the $x$ axis intersects the same at a point where a projected continuation of said feed curve intersects said $y$ axis, phi is the angle at which said feed curve diverges from said sidewalls, alpha the angle between said feed curve continuation and said $x$ axis, and X the ratio of any abscissa to said curve and the radial distance to said sidewall at said axial section, wherein alpha is substantially equal to the minimum flow angle of a plastic material to be extruded, and phi is substantially equal to 45° plus ½ said minimum flow angle.

8. A tubular extrusion die having, in axial section, oppositely disposed substantially parallel inner side walls comprising a throat, said side walls being outwardly flared at one end thereof to provide an orifice portion conforming substantially to the orifice sector of the static zone of a punch test made of a material to be extruded, said static zone being of such dimensions that with the base thereof disposed along a perpendicular to said die axis and with the edge of said zone coincident with a wall of said throat, said orifice sector subtends an angle at said die axis which is substantially equal to the minimum flow angle of said material, said throat having a volume which is substantially equal to the volume between said outwardly flared side walls plus that of a hemisphere having a radius equal to the maximum radius of said orifice sector.

9. A tubular extrusion member having side walls and a concave feed surface which converges therefrom toward a throat, said feed surface terminating adjacent said throat in a convexly curved orifice portion extending between the end of said feed surface and the wall of said throat, said surface comprising, in axial section, a continuous curve constituted of an arithmetic progression of terms representing equal concentric volumes to be displaced during extrusion, said curve corresponding substantially to the formula $$\text{delta} = \text{alpha} + (n-1)\text{ beta}$$

wherein $n$ is the number of such equal volumes disposed between the axis of said member and any point on said curve, delta is the angular slope of said curve at any point thereof with respect to a perpendicular to said axis, beta is the constant angular increment by which said slope is changed in passing from one said volume to the next, and alpha the angle between said curve and a perpendicular to said axis at the point of intersection of said curve with said axis, and wherein alpha has a magnitude substantially equal to the minimum angle of internal flow of a plastic material to be extruded, and wherein said curve intersects said side walls at an angle substantially equal to the angle of rupture of said material, said throat having, in said axial section, oppositely disposed substantially parallel inner side walls, and said throat having a volume which is substantially equal to the orifice volume which is substantially equal to the volume of a hemisphere having a radius equal to the distance between a point on the axis of said throat and in a plane passing through the intersection of said orifice portion with the wall of said throat and the end of said feed surface.

10. A tubular extrusion member having side walls and a movable end wall with an orifice therein and having a concave feed surface which converges therefrom toward said orifice, said orifice having a throat and said feed surface terminating adjacent said throat in a convexly curved orifice portion tangential to said feed surface and extending thence to said throat, said feed surface comprising, in axial section, a continuous curve constituted of an arithmetic progression of terms representing equal concentric volumes to be displaced during extrusion, said curve corresponding substantially to the formula $$\text{delta} = \text{alpha} + (n-1)\text{ beta}$$

wherein $n$ is the number of such equal volumes disposed between the axis of said member and any point on said curve, delta is the angular slope of said curve at any point thereof with respect to a perpendicular to said axis, beta is the constant angular increment by which said slope is changed in passing from one said volume to the next, and alpha the angle between said curve and a perpendicular to said axis at the point of intersection of said curve with said axis, and wherein alpha has a magnitude substantially equal to the minimum angle of internal flow of a plastic material to be extruded, and said curve intersects said side walls at an angle substantially equal to the angle of rupture of said material, and wherein said orifice portion has a curvature in axial section conforming substantially to the flow path of said material about the edge of a punch forced into said plastic material, and said throat having, at said axial section, oppositely disposed substantially parallel inner side walls, and the volume of said throat being substantially equal to the volume encircled by said convexly curved orifice portion plus that of a hemisphere having a radius equal to that of said orifice portion at its point of tangency with said feed surface.

11. A tubular extrusion member for extruding plastic material having a predetermined minimum angle of internal flow and a predetermined angle of rupture, said member having an inner sidewall and a movable end wall and a concave feed surface which extends from said sidewall toward an orifice in said end wall, said feed surface having a shape in a section taken axially of said member conforming to the portion of an imaginary curve extending between said sidewall and said orifice, said curve extending from said sidewall to the center of said orifice and having one of the following formulas:

(1) $\qquad$ gamma = phi + $(n_a - 1)$ beta (2) $\qquad$ delta = alpha + $(n - 1)$ beta (3) $$dy/dx = \tan\left[\text{alpha} + \frac{2}{3}(90° - \text{phi} - \text{alpha})X^2\right]$$

wherein the $y$ axis is parallel to the axis of said member and passes through the center of said orifice, gamma is the angular slope of said curve with respect to said $y$ axis, phi is the angle at which said curve diverges from said sidewall and is substantially equal to said predetermined angle of rupture, $n_a$ is the number of equal concentric volumes of the material between said sidewall and any point on said curve to be displaced during extrusion, $n$ is the number of equal concentric volumes of the material between said $y$ axis and any point on said curve to be displaced during extrusion, beta is the angular increment by which said slope is changed in passing from one said volume to the next and is determined from the following formula:

(4) $$\text{beta} = \frac{\pi/2 - \text{alpha} - \text{phi}}{N - 1}$$

the $x$ axis is perpendicular to the $y$ axis and intersects the $y$ axis at the point of intersection of said curve with said $y$ axis, delta is the angular slope of said curve at any point thereof with respect to a perpendicular to said axis, alpha is the angle at which said curve intersects said $x$ axis and is substantially equal to said predetermined minimum angle of internal flow, X is the ratio of any abscissa to said curve to the distance between said $y$ axis and said sidewall, and N is the total number of said equal concentric volumes.

12. A tubular extrusion member for extruding plastic material having a predetermined minimum angle of internal flow and a predetermined angle of rupture, said member having an inner sidewall and a movable end wall and a concave feed surface which extends from said sidewall toward an orifice in said end wall, said feed surface having a shape in a section taken axially of said member conforming to the portion of an imaginary curve extending between said sidewall and said orifice, said curve extending from said sidewall to the center of said orifice and having one of the following formulas:

(1) $\qquad$ gamma = phi + $(n_a - 1)$ beta (2) $\qquad$ delta = alpha + $(n - 1)$ beta (3) $$dy/dx = \tan\left[\text{alpha} + \frac{2}{3}(90° - \text{phi} - \text{alpha})X^2\right]$$

wherein the $y$ axis is parallel to the axis of said member and passes through the center of said orifice, gamma is the angular slope of said curve with respect to said $y$ axis, phi is the angle at which said curve diverges from said sidewall and is substantially equal to said predetermined angle of rupture, $n_a$ is the number of equal concentric volumes of the material between said sidewall and any point on said curve to be displaced during extrusion, $n$ is the number of equal concentric volumes of the material between said $y$ axis and any point on said curve to be displaced during extrusion, beta is the angular increment by which said slope is changed in passing from one said volume to the next and is determined from the following formula:

(4) $$\text{beta} = \frac{\pi/2 - \text{alpha} - \text{phi}}{N - 1}$$

the $x$ axis is perpendicular to the $y$ axis and intersects the $y$ axis at the point of intersection of said curve with said $y$ axis, delta is the angular slope of said curve at any point thereof with respect to a perpendicular to said axis, alpha is the angle at which said curve intersects said $x$ axis and is substantially equal to said predetermined minimum angle of internal flow, X is the ratio of any abscissa to said curve to the distance between said $y$ axis and said sidewall, and N is the total number of said equal concentric volumes.

References Cited in the file of this patent

UNITED STATES PATENTS

| | | |
|---|---|---|
| 1,109,555 | Summey | Sept. 1, 1914 |
| 1,331,169 | Swift et al. | Feb. 17, 1920 |
| 2,335,590 | Gersman | Nov. 30, 1943 |
| 2,597,638 | Higbie | May 20, 1952 |
| 2,660,302 | Gersman | Nov. 24, 1953 |